(12) United States Patent
Kim et al.

(10) Patent No.: US 8,923,249 B2
(45) Date of Patent: Dec. 30, 2014

(54) METHOD AND APPARATUS FOR SCRAMBLING SEQUENCE GENERATION IN A COMMUNICATION SYSTEM

(75) Inventors: Byoung-Hoon Kim, Seoul (KR); Juan Montojo, San Diego, CA (US); Peter Gaal, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 839 days.

(21) Appl. No.: 12/410,694

(22) Filed: Mar. 25, 2009

(65) Prior Publication Data

US 2009/0249027 A1 Oct. 1, 2009

Related U.S. Application Data

(60) Provisional application No. 61/039,713, filed on Mar. 26, 2008.

(51) Int. Cl.
*H04B 7/216* (2006.01)
*G06F 1/02* (2006.01)
*H04L 25/03* (2006.01)
*H04L 5/00* (2006.01)

(52) U.S. Cl.
CPC ......... *H04L 25/03866* (2013.01); *H04L 5/0007* (2013.01)
USPC ........... 370/335; 370/208; 370/515; 708/250; 380/268; 375/132

(58) Field of Classification Search
None
See application file for complete search history.

(56) References Cited

U.S. PATENT DOCUMENTS

| | | | | |
|---|---|---|---|---|
| 5,111,416 A | * | 5/1992 | Harada | 708/250 |
| 5,596,571 A | * | 1/1997 | Gould et al. | 370/335 |
| 6,339,781 B1 | * | 1/2002 | Sasaki | 708/252 |
| 6,590,951 B1 | | 7/2003 | Kim et al. | |
| 6,798,736 B1 | | 9/2004 | Black et al. | |
| 6,831,905 B1 | | 12/2004 | Lomp et al. | |
| 6,922,435 B2 | | 7/2005 | Neufeld et al. | |
| 7,236,512 B2 | | 6/2007 | Blessent et al. | |
| 7,386,026 B1 | * | 6/2008 | Gold | 375/130 |
| 8,169,944 B2 | | 5/2012 | Walton et al. | |
| 8,208,364 B2 | | 6/2012 | Walton et al. | |
| 2002/0012384 A1 | * | 1/2002 | Berens | 370/335 |

(Continued)

FOREIGN PATENT DOCUMENTS

CN 1783763 A 6/2006
CN 101056469 A 10/2007

(Continued)

OTHER PUBLICATIONS

NTT Docomo et al: "Pilot Sequence Allocation Method in EUTRA Uplink" 3GPP TSG RAN WG1 Meeting #46, vol. R1-062103, Aug. 28, 2006, XP050102648 Tallinn, Estonia.

(Continued)

*Primary Examiner* — Timothy J Weidner
(74) *Attorney, Agent, or Firm* — Anthony R. Morris

(57) ABSTRACT

A wireless communications method is provided. The method includes employing a processor executing computer executable instructions stored on a computer readable storage medium to implement various acts. The method also includes generating cyclic shifts for a sequence generator by masking shift register output values with one or more vectors. The method includes forwarding the sequence generator to a future state based in part on the output values and the vectors.

34 Claims, 11 Drawing Sheets

(56) References Cited

U.S. PATENT DOCUMENTS

| | | | |
|---|---|---|---|
| 2003/0223397 | A1 | 12/2003 | Iacono et al. |
| 2004/0062397 | A1 | 4/2004 | Amer |
| 2004/0233885 | A1* | 11/2004 | Helmke .......................... 370/348 |
| 2005/0124352 | A1 | 6/2005 | Fernandez-Corbaton et al. |
| 2005/0169349 | A1* | 8/2005 | Hwang et al. ................. 375/130 |
| 2006/0206780 | A1 | 9/2006 | Ariyama |
| 2006/0290508 | A1 | 12/2006 | Moutchkaev et al. |
| 2007/0025462 | A1 | 2/2007 | Sato |
| 2007/0037541 | A1 | 2/2007 | Wu et al. |
| 2007/0082696 | A1 | 4/2007 | Wang |
| 2007/0230600 | A1 | 10/2007 | Bertrand et al. |
| 2007/0253465 | A1 | 11/2007 | Muharemovic et al. |
| 2008/0043680 | A1* | 2/2008 | Fitton ............................ 370/335 |
| 2008/0080472 | A1 | 4/2008 | Bertrand et al. |
| 2009/0092148 | A1* | 4/2009 | Zhang et al. .................. 370/458 |
| 2009/0136034 | A1 | 5/2009 | Gaal et al. |
| 2009/0181692 | A1 | 7/2009 | Gaal et al. |
| 2009/0204824 | A1 | 8/2009 | Lin et al. |
| 2010/0220664 | A1 | 9/2010 | Hooli et al. |
| 2013/0094391 | A1 | 4/2013 | Padovani et al. |

FOREIGN PATENT DOCUMENTS

| | | |
|---|---|---|
| EP | 1092270 A1 | 4/2001 |
| JP | 2001024624 A | 1/2001 |
| JP | 2002543666 | 12/2002 |
| JP | 2003504946 A | 2/2003 |
| JP | 2007028289 A | 2/2007 |
| JP | 2009535936 A | 10/2009 |
| JP | 5100747 B2 | 12/2012 |
| JP | 5130351 B2 | 1/2013 |
| KR | 20070048202 A | 5/2007 |
| RU | 95116586 | 9/1997 |
| RU | 2186460 C1 | 7/2002 |
| RU | 2005115869 A | 10/2005 |
| RU | 2005115873 A | 1/2006 |
| RU | 2303856 C2 | 7/2007 |
| SU | 966864 A1 | 10/1982 |
| SU | 1387177 A1 | 4/1988 |
| WO | 0018055 | 3/2000 |
| WO | WO0060751 A1 | 10/2000 |
| WO | 0065757 A1 | 11/2000 |
| WO | WO0105079 A1 | 1/2001 |
| WO | 0227961 A2 | 4/2002 |
| WO | WO0245288 A2 | 6/2002 |
| WO | WO2004030224 A1 | 4/2004 |
| WO | 2004038951 A2 | 5/2004 |
| WO | 2004038984 A2 | 5/2004 |
| WO | 2004059936 A1 | 7/2004 |
| WO | WO2006102252 A1 | 9/2006 |
| WO | 2006134829 A1 | 12/2006 |
| WO | 2007005978 A2 | 1/2007 |
| WO | 2007023810 A1 | 3/2007 |
| WO | 2007094775 A1 | 8/2007 |
| WO | 2007127902 A2 | 11/2007 |

OTHER PUBLICATIONS

Anonymous: "3GPP TS 36.211 V8.0.0; Evolved Universal Terrestrial Radio Access (E-UTRA); Physical channels and modulation (Release 8)" 3rd Generation Partnership Project; Technical Specification Group Radio Access Network, [Online] 2007, XP002520076 Retrieved from the Internet: URL:http://www.Sgpp.org/ftp/Specs/html-i nf o/36211.htm> [retrieved on Sep. 27, 2007] Section 5.

Choi D-W: "Parallel Scramblung Techniques for Digital Multiplexers" AT & T Technical Journal, American Telephone and Telegraph Co. New York, vol. 65, No. 5, Sep. 1, 1986, pp. 123-136, XP000616778 ISSN: 8756-2324 p. 123-p. 129.

International Search Report and Written Opinion—PCT/US09/038346—International Search Authority—European Patent Office—Jul. 28, 2009.

Nokia Siemens Networks et al: "Cyclic Shift Hopping and DM RS Signaling" 3rd Generation Partnership Project (3GPP); Technical Specification Group (TSG) Radio Access Network (RAN); Working-Group 1 (WG1) , XX, XX #49, [Online] No. R1-072294, May 7, 2007, pp. 1-4, XP002494363.

NTT Docomo et al: "Sequence Hopping and Cyclic-Shift Value Hopping for Uplink Reference Signal in E-UTRA" 3GPP TSG-RAN WG1 #48BIS ST Julians, Malta, [Online] No. R1-071643, Mar. 26, 2007, pp. 1-4, XP002494362.

Walther U et al: "Pn-generators embedded in high performance signal processors" ISCAS 2001. Proceedings of the 2001 IEEE International Symposium on Circuits and Systems. Sydney, Australia, May 6-9 , 2001; [IEEE International Symposium on Circuits and Systems], New York, NY : IEEE, US, vol. 4, May 6, 2001, pp. 45-48, XP010541788 ISBN: 978-0-7803-6685-5 pp. IV-46, left-hand column; figure 3 pp. IV-47, left-hand column; figure 6.

Walther U et.al: "Pn-generators embedded in high performance signal processors" ISCAS 2001. Proceedings of the 2001 IEEE International Symposium on Circuits and Systems. Sydney, Australia, May 6-9, 2001; [IEEE International Symposium on Circuits and Systems], New York, NY : IEEE, US, vol. 4, May 6, 2001, pp. 45-48, XP010541788 ISBN: 978-0-7803-6685-5 p. 45, right-hand column—p. 47, left-hand column; figure 3.

Jian Ren et al: "CDMA physical layer built—i n security enhancement" Vehicular Technology Conference, 2003. VTC 2003-Fall. 2003 IEEE 58th Orlando, FL, USA Oct. 6-9, 2003; [IEEE Vehicular Technolgy Conference], Piscataway, NJ, USA,IEEE, US, vol. 3, Oct. 6, 2003, pp. 2157-2161, XP010701813 ISBN: .978-0-7803-7954-1 p. 2157-p. 2158; figure 1.

Qualcomm Europe, "Completing the Scrambling Details in the specifications," R1-080487, 3GPP RAN1 #51bis meeting (Jan. 18, 2008).

Qualcomm Europe, "Details on Scrambling," R1-074967, 3GPP RAN1 #51 meeting (Nov. 9, 2007).

Qualcomm Europe, "Hopping of UL DM-RS," R1-074950, 3GPP RAN1 #51 meeting (Nov. 9, 2007).

Samsung: "Implicit resource allocation for uplink ACK/NACK signaling", 3GPP TSG RAN WG1 #49, R1-072227, Kobe, Japan, May 7-11, 2007.

3GPP, "LTE Scrambling Codes", Ericsson, Qualcomm, Nokia, NSN, R1-075089, Nov. 13, 2007, pp. 2.

Motorola, "Uplink DM RS-Open Issues[online]", 3GPP R1-080065, <URL:http://www.3gpp.org/ftp/tsg_ran/WG1_RL1/TSGR1_51b/Docs/R1-080065.zip>,Jan. 9, 2006.

NTT Docomo et al., "Hopping and Planning of Sequence Groups for Uplink RS",3GPP R1-074804,Nov. 9, 2007.

Qualcomm Europe, "Hopping of UL DM-RS", 3GPP R1-080963,Feb. 15, 2008.

Qualcomm Europe,"Hopping of UL DM-RS and Other Details", 3GPP R1-080468,Jan. 18, 2008.

Samsung, "Cyclic Shift Hopping of UL ACK Channels", 3GPP R1-073149,Jun. 29, 2007.

Taiwan Search Report—TW098109963—TIPO—Jan. 13, 2013.

Qualcomm Europe, "Details on Scrambling", 3GPPTSG-RAN WG1#50b, R1-074429, Oct. 8-12, 2007, Shanghai, P. R. China, URL: http://www.3gpp.org/ftp/tsg_ran/WG1_RL1/TSGR1_50b/Docs/R1-074429.zip.

Qualcomm Europe: "Specification details for PRS sequences", 3GPP Draft, R1-080466, 3rd Generation Partnership Project (3GPP), Mobile Competence Centre, 650, Route Des Lucioles, F-06921 Sophia-Antipolis Cedex , France, vol. RAN WG1, no. Sevilla, Spain, Jan. 9, 2008, XP050108984, [retrieved on Jan. 9, 2008].

Qualcomm Europe, "Specification details for PRS sequences", 3GPP TSG-RAN WG1#52, R1-080640, Jan. 9, 2008, Sorrento, Italy, URL: http://www.3gpp.org/ftp/tsg_ran/WG1_RL1/TSGR1_52/Docs/R1-080640.zip.

* cited by examiner

METHOD AND APPARATUS FOR SCRAMBLING SEQUENCE GENERATION IN A COMMUNICATION SYSTEM

CLAIM OF PRIORITY UNDER 35 U.S.C. §119

This application claims the benefit of U.S. Provisional Patent Application No. 61/039,713, entitled METHOD AND APPARATUS FOR SCRAMBLING SEQUENCE GENERATION IN A COMMUNICATION SYSTEM, and filed on Mar. 26, 2008, the entirety of which is incorporated herein by reference.

BACKGROUND

I. Field

The following description relates generally to wireless communications systems, and more particularly to scrambling sequence generation in a wireless communications system.

II. Background

Wireless communication systems are widely deployed to provide various types of communication content such as voice, data, and so forth. These systems may be multiple-access systems capable of supporting communication with multiple users by sharing the available system resources (e.g., bandwidth and transmit power). Examples of such multiple-access systems include code division multiple access (CDMA) systems, time division multiple access (TDMA) systems, frequency division multiple access (FDMA) systems, 3GPP Long Term Evolution (LTE) systems including E-UTRA, and orthogonal frequency division multiple access (OFDMA) systems.

An orthogonal frequency division multiplex (OFDM) communication system effectively partitions the overall system bandwidth into multiple ($N_F$) subcarriers, which may also be referred to as frequency sub-channels, tones, or frequency bins. For an OFDM system, the data to be transmitted (i.e., the information bits) is first encoded with a particular coding scheme to generate coded bits, and the coded bits are further grouped into multi-bit symbols that are then mapped to modulation symbols. Each modulation symbol corresponds to a point in a signal constellation defined by a particular modulation scheme (e.g., M-PSK or M-QAM) used for data transmission. At each time interval that may be dependent on the bandwidth of each frequency subcarrier, a modulation symbol may be transmitted on each of the $N_F$ frequency subcarrier. Thus, OFDM may be used to combat inter-symbol interference (ISI) caused by frequency selective fading, which is characterized by different amounts of attenuation across the system bandwidth.

Generally, a wireless multiple-access communication system can concurrently support communication for multiple wireless terminals that communicate with one or more base stations via transmissions on forward and reverse links. The forward link (or downlink) refers to the communication link from the base stations to the terminals, and the reverse link (or uplink) refers to the communication link from the terminals to the base stations. This communication link may be established via a single-in-single-out, multiple-in-signal-out or a multiple-in-multiple-out (MIMO) system.

A MIMO system employs multiple (NT) transmit antennas and multiple (NR) receive antennas for data transmission. A MIMO channel formed by the NT transmit and NR receive antennas may be decomposed into NS independent channels, which are also referred to as spatial channels, where NS≤min{NT, NR}. Generally, each of the NS independent channels corresponds to a dimension. The MIMO system can provide improved performance (e.g., higher throughput and/or greater reliability) if the additional dimensionalities created by the multiple transmit and receive antennas are utilized. A MIMO system also supports time division duplex (TDD) and frequency division duplex (FDD) systems. In a TDD system, the forward and reverse link transmissions are on the same frequency region so that the reciprocity principle allows estimation of the forward link channel from the reverse link channel. This enables an access point to extract transmit beam-forming gain on the forward link when multiple antennas are available at the access point.

In Long Term Evolution (LTE) systems, Gold sequences are used for various randomization purposes such as uplink (UL) VRB-to-PRB mapping, sequence scrambling (virtual resource block and physical resource block), random sequence generation, UL demodulation (DM) reference signal (RS) index hopping, and so forth. The sequences can be individualized by setting the initial states of the component shift registers to different values. In certain cases, such as the decoding of the physical broadcast channel (PBCH), multiple sequence time shift hypotheses need to be tested, which necessitates that multiple cyclic shifts of the same sequence need to be generated at the same time. Another common problem with the accepted Gold sequence design is that the first few dozen sequence bits are not sufficiently random. Thus, sequences that are initialized with similar values can yield similar sequence bits up to the length of the component sequence generator shift registers. This is aggravated by the fact that some of the sequences generated are relatively short, thus the insufficiently random initial segment is not an insignificant portion of the sequence length.

SUMMARY

The following presents a simplified summary in order to provide a basic understanding of some aspects of the claimed subject matter. This summary is not an extensive overview, and is not intended to identify key/critical elements or to delineate the scope of the claimed subject matter. Its sole purpose is to present some concepts in a simplified form as a prelude to the more detailed description that is presented later.

Systems and methods provide concurrent random sequence generation for multiple cyclic shift hypotheses. In order to improve randomization, sequence generators can be fast forwarded to a specified future state, where respective sequence bits from the generators can be output from then on. To perform this fast forward function efficiently, it is beneficial to provide a method that can jump to a future state in a substantially rapid manner. Different cyclic shifts of Gold sequences can be generated by masking shift register output values with desired vectors and with modulo-2 adding the result, for example. This method can also be employed to generate multiple cyclic shift copies of the Gold sequence at about the same time, if desired. The masking vector can be derived from the sequence generator polynomial and the desired cyclic shift. In general, the mask for two component m-sequences of the Gold sequence generator can be different. Sequence and randomization components can also be paralleled to improve system performance.

To the accomplishment of the foregoing and related ends, certain illustrative aspects are described herein in connection with the following description and the annexed drawings. These aspects are indicative, however, of but a few of the various ways in which the principles of the claimed subject matter may be employed and the claimed subject matter is intended to include all such aspects and their equivalents.

Other advantages and novel features may become apparent from the following detailed description when considered in conjunction with the drawings.

DETAILED DESCRIPTION

Systems and methods are provided to generate random sequences for wireless communications in an efficient manner. In one aspect, a wireless communications method is provided. The method includes employing a processor executing computer executable instructions stored on a computer readable storage medium to implement various acts. The method also includes generating cyclic shifts for a sequence generator by masking shift register output values with one or more vectors. The method includes forwarding the sequence generator to a future state based in part on the output values and the vectors.

Figure 1:
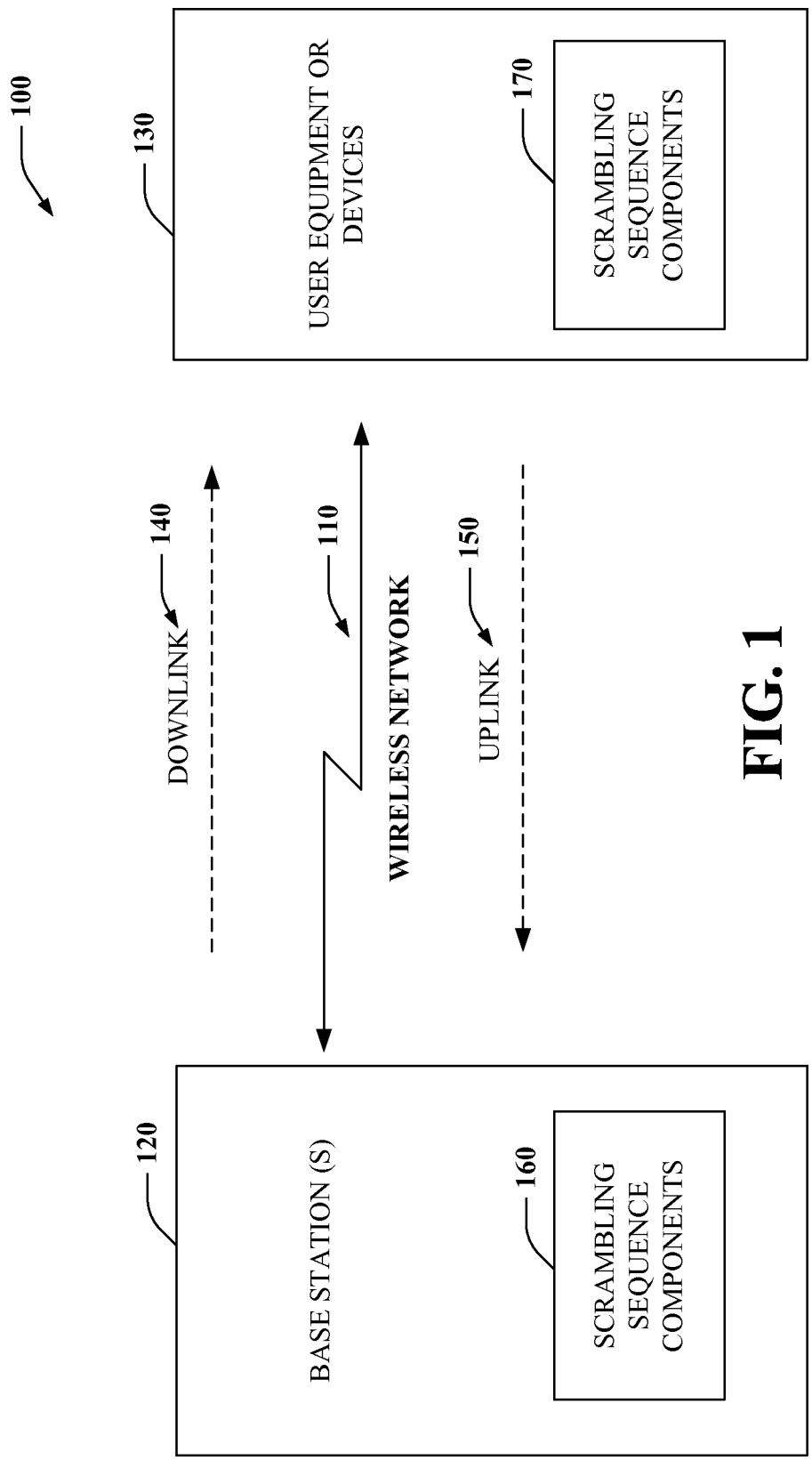
FIG. 1 is a high level block diagram of a system that employs scrambling sequence components in a wireless communications environment.

Referring now to FIG. 1, scrambling sequence components are employed for a wireless communications system. The system 100 includes one or more base stations 120 (also referred to as a node, evolved node B-eNB, femto station, pico station, and so forth) which can be an entity capable of communication over a wireless network 110 to a second device 130 (or devices). For instance, each device 130 can be an access terminal (also referred to as terminal, user equipment, mobility management entity (MME) or mobile device). The base station 120 communicates to the device 130 via downlink 140 and receives data via uplink 150. Such designation as uplink and downlink is arbitrary as the device 130 can also transmit data via downlink and receive data via uplink channels. It is noted that although two components 120 and 130 are shown, that more than two components can be employed on the network 110, where such additional components can also be adapted for the wireless protocols described herein. As shown, a scrambling sequence component 160 and 170 respectively (or components) is provided to generate random Gold (or other type) sequences in an efficient manner. It is noted that as used herein, the term scrambling sequence component 160 or 170 can include generator and/or decoder aspects. For example, the component 160 can be a generator of random sequences, whereas the component 170 could be a decoder of random sequences, for example.

In general, the scrambling sequence components 160 and 170 provide concurrent random sequence generation for multiple cyclic shift hypotheses. In order to improve randomization, sequence generators (or other components) can be fast forwarded to a specified future state (as shown and described with respect to FIG. 2 below), where respective sequence bits from the generators can be output from then on. To perform this fast forward function efficiently, it is beneficial to provide a method that can jump to a future state in a substantially rapid manner. A plurality of different cyclic shifts of Gold sequences can be generated by masking shift register output values with desired vectors and with modulo-2 adding the result, for example. This method can also be employed to generate multiple cyclic shift copies of the Gold sequence at about the same time, if desired. The masking vector can be derived from the sequence generator polynomial and the desired cyclic shift. In general, the mask for two component m-sequences of the Gold sequence generator can be different. Sequence and randomization components can also be paralleled to improve system performance as illustrated in an example system depicted in FIG. 4. As will be described in more detail below, various m-codes can be selected to determine a desired fast forward starting point for the sequence generators. Various g-codes can be selected to generate different random sequences for different base stations 120, for example.

It is noted that the system 100 can be employed with an access terminal or mobile device, and can be, for instance, a module such as an SD card, a network card, a wireless network card, a computer (including laptops, desktops, personal digital assistants (PDAs)), mobile phones, smart phones, or any other suitable terminal that can be utilized to access a network. The terminal accesses the network by way of an access component (not shown). In one example, a connection between the terminal and the access components may be wireless in nature, in which access components may be the base station and the mobile device is a wireless terminal. For instance, the terminal and base stations may communicate by way of any suitable wireless protocol, including but not limited to Time Divisional Multiple Access (TDMA), Code Division Multiple Access (CDMA), Frequency Division Multiple Access (FDMA), Orthogonal Frequency Division Multiplexing (OFDM), FLASH OFDM, Orthogonal Frequency Division Multiple Access (OFDMA), or any other suitable protocol.

Access components can be an access node associated with a wired network or a wireless network. To that end, access components can be, for instance, a router, a switch, or the like. The access component can include one or more interfaces, e.g., communication modules, for communicating with other network nodes. Additionally, the access component can be a base station (or wireless access point) in a cellular type network, wherein base stations (or wireless access points) are utilized to provide wireless coverage areas to a plurality of subscribers. Such base stations (or wireless access points) can be arranged to provide contiguous areas of coverage to one or more cellular phones and/or other wireless terminals.

Figure 2:
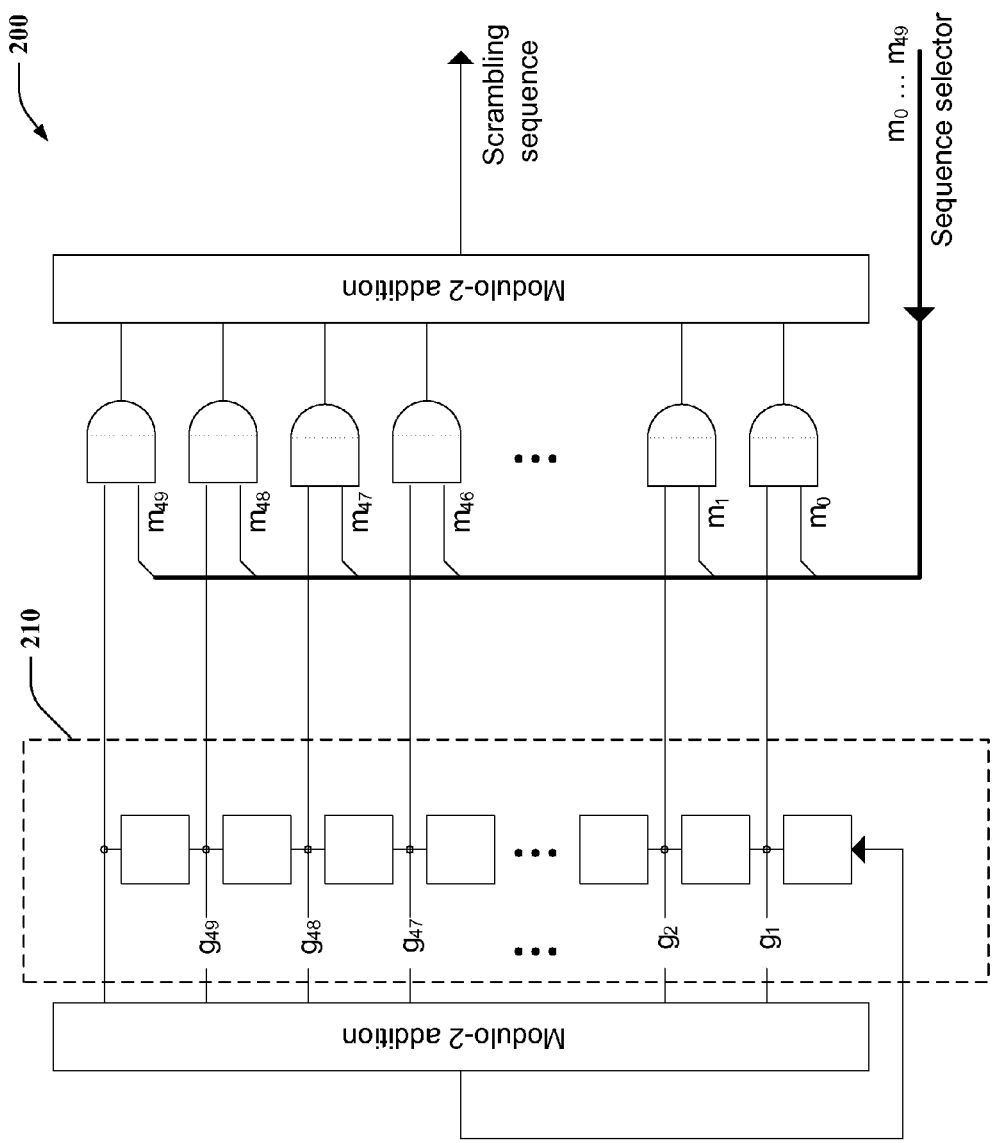
FIG. 2 is a system that illustrates an exemplary scrambling sequence generator for a wireless system.

Referring now to FIG. 2, a system 200 illustrates an example sequence generator for a wireless system. A PRN scrambling sequence generator structure is illustrated by the system 200. The system 200 is flexible to enable generating scrambling sequences for current applications and also for new applications that may be added in the future. At various instances of the transmit signal generation process, scrambling is to be applied. This is to avoid persistent interference between different signals and to avoid undesired signal spectrum properties. For certain signals, it is beneficial to have the scrambling associated with the resource element the signal occupies, for other type of scrambling sequence applications, it is desirable to have the scrambling sequence to be disassociated from the resource element occupied. In this aspect, scrambling sequence generation is provided that can be used for substantially all applications.

A binary m-sequence can be employed as the basic scrambling code. For different purposes, different cyclic shifts of the same sequence are used. The underlying assumption is that the different shifts of the same sequence are sufficiently de-correlated. The shift register sequence length should be sufficiently large. In the example shown at 200, assume a 50-bit shift register, which is capable of generating a sequence with a period of 2 to the power of 50. The generating polynomial—$G(X)=X^{50}+G_{49}X^{49}+G_{48}X^{48}+ \ldots +G_2X^2+G_1X+1$ can be the same for all applications, which avoids having to reconfigure the shift registers. The shift register can be set to the same initial stage for each application, if desired. The different cyclic shifts can be achieved by modulo-2 summing certain register outputs, where the choice of which register outputs to be included in the sum controls the cyclic shift selection. An example architecture is provided by the system 200. Note that each of the polynomial coefficients (at reference numeral 210) $G_{49} \ldots G_2, G_1$ represents a connection if the coefficient is '1' and no connection if the coefficient is '0'.

As noted above, the scrambling sequences can be individualized by the choice of the register outputs. Since 50 shift registers (or other number) are available, 50 selector bits can be provided, yielding 2 to the power of 50 different shifts. The allocation of the controlling 50 bits is defined as follows. The 50 bits are divided into the first 2 bits that are reserved, the next 4 bits that are the channel/signal type, and the remaining 44 bits that are allocated in a channel/signal-specific manner. This is shown in Table 1 below.

TABLE 1

Scrambling Selector Bit Designation

| Field | Sequence selector assignment | Number of bits |
|---|---|---|
| Reserved | $M_{48} \ldots M_{49}$ | 2 |
| Channel/signal type | $M_{44} \ldots M_{47}$ | 4 |
| Channel/signal-specific fields | $M_0 \ldots M_{43}$ | 44 |

The Channel/Signal Types are Enumerated as Listed in Table 2 Below:

TABLE 2

Channel Type Value Assignment

| Channel/Signal | Channel type value |
|---|---|
| PRS (normal CP) | '0000' |
| PRS (extended CP) | '0001' |
| PDCCH | '0010' |
| PCFICH | '0011' |
| PHICH | '00100' |
| PBCH | '0101' |
| PMCH | '0110' |
| PDSCH | '0111' |
| PUSCH | '1000' |
| Other | Reserved |

Note that 10 ms periodicity can be assumed for: PRS (normal and extended CP), PDCCH, PDSCH, PUSCH. Also, 40 ms periodicity can be assumed for PBCH. For PCFICH, PHICH and PMCH a decision on the scrambling periodicity is to be made. The channel-specific fields can be defined separately for each channel type as shown below.

PRS (Normal CP) Signal Specific Fields:

TABLE 3

PRS (normal CP) signal-specific Fields

| Parameter | Number of bits |
|---|---|
| SSC_ID | 8 |
| Antenna_ID | 2 |
| Subframe_ID | 4 |
| Symbol_ID | 4 |
| Frequency_+/− | 1 |
| Reserved | 25 |

PRS (Extended CP) Signal Specific Fields:

TABLE 4

PRS (extended CP) signal-specific Fields

| Parameter | Number of bits |
|---|---|
| Cell_ID | 9 |
| Antenna_ID | 2 |
| Subframe_ID | 4 |
| Symbol_ID | 4 |
| Frequency_+/− | 1 |
| Reserved | 24 |

PDCCH Channel-Specific Fields:

TABLE 5

PDCCH Channel-specific Fields

| Parameter | Number of bits |
|---|---|
| Cell_ID | 9 |
| Subframe_ID | 4 |
| Symbol_ID | 4 |
| Reserved | 27 |

PDSCH Channel-Specific Fields:

TABLE 6

PDSCH Channel-specific Fields

| Parameter | Number of bits |
|---|---|
| Cell_ID | 9 |
| UE MAC_ID | 16 |
| Stream_ID | 1 |
| Code block ID | 6 |
| Reserved | 12 |

Note that the table above assumes the possibility to have a PDSCH scrambling that is a function of the Cell_ID as well as of the UE MAC_ID.

PBCH Channel-Specific Fields:

TABLE 7

| PBCH Channel-specific Fields | |
| --- | --- |
| Parameter | Number of bits |
| Cell_ID | 9 |
| Frame_ID | 2 |
| Subframe_ID | 4 |
| Symbol_ID | 4 |
| Reserved | 25 |

PCFICH Channel-Specific Fields:

TABLE 8

| PBCH Channel-specific Fields | |
| --- | --- |
| Parameter | Number of bits |
| Cell_ID | 9 |
| Subframe_ID | 4 |
| Reserved | 31 |

PHICH Channel-Specific Fields:

TABLE 9

| PBCH Channel-specific Fields | |
| --- | --- |
| Parameter | Number of bits |
| Cell_ID | 9 |
| XX | xx |
| Reserved | xx |

PMCH Channel-Specific Field:

TABLE 10

| PMCH Channel-specific Fields | |
| --- | --- |
| Parameter | Number of bits |
| Cell_ID | 9 |
| XX | xx |
| Reserved | xx |

PUSCH Channel-Specific Fields:

TABLE 11

| PUSCH Channel-specific Fields | |
| --- | --- |
| Parameter | Number of bits |
| UE MAC_ID | 16 |
| Code block ID | 6 |
| Reserved | 22 |

The sequence generator can be reset at the beginning of each application of scrambling. This can be performed once at each symbol for the downlink (DL) RS, and once for the code block in the case of the PDSCH, for example. For the scrambling of binary encoded bits, one scrambling bit can be taken for each encoded bit. For the generation of the PRS sequences, two scrambling sequences can be generated, distinguished by the Frequency +/−bit. The first sequence can be used to scramble the 'positive frequencies' starting from the smallest positive frequency and mapped to DL RS tone indices in the order of increasing frequency. The second sequence can be used to scramble the 'negative frequencies' starting from highest negative frequency (e.g., closest to DC) and mapped to the DL RS tone indices in the opposite order. This allows that the PRS in the center of the system band is the same irrespective of the system bandwidth. Also, it does not require generating the entire scrambling sequence at each OFDM symbol carrying PRS for the possible PRS length. The proposed structure enables using a single shift register to generate the scrambling sequences. This assumes that the shift register is clocked as many times as required for the longest scrambling sequence. For shorter sequences, the initial part corresponding to the appropriate length is taken. It is also possible to have multiple instances of the shift register, one for each application, which may fit certain hardware architectures more suitably.

Figure 3:
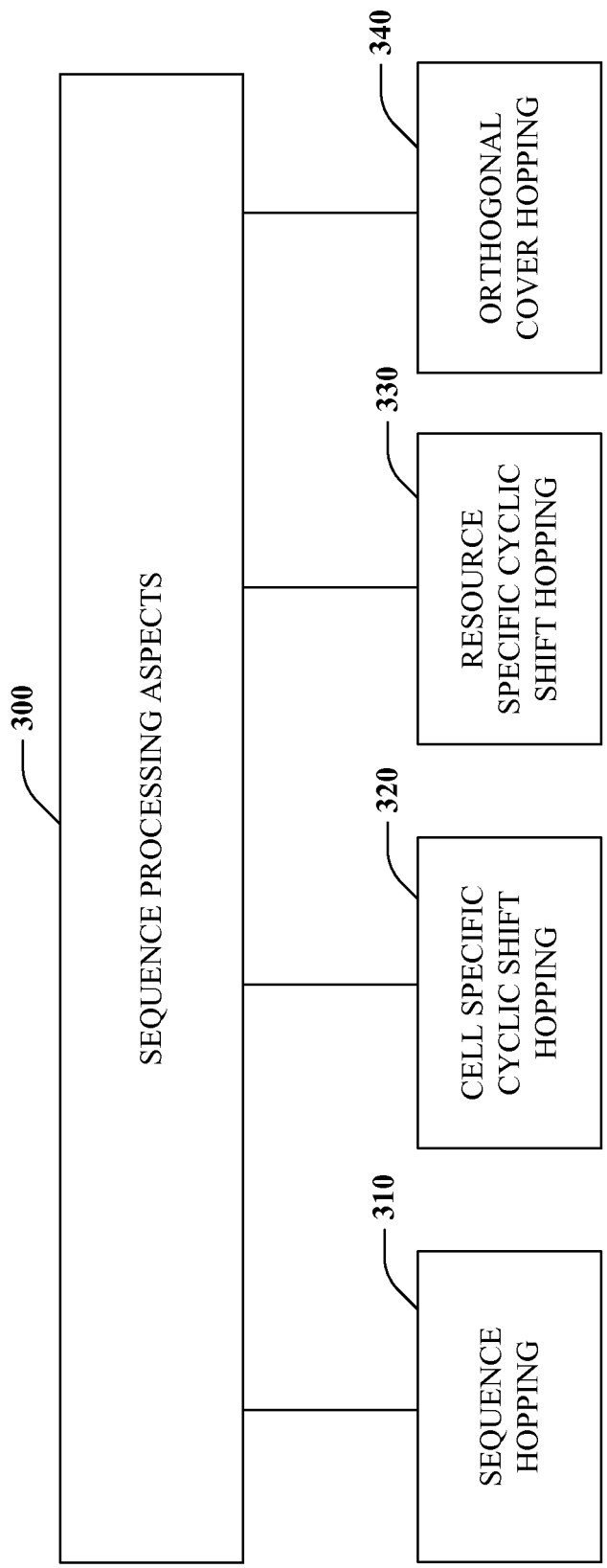
FIG. 3 illustrates example sequence processing aspects for a wireless communications system.

Turning to FIG. 3, example sequence processing aspects 300 are illustrated. In an LTE system, in particular the LTE uplink (UL), the resources used for demodulation reference signal (DM RS) and the various control channel spreading signals are to be randomized. This following describes mechanisms and techniques to achieve this goal by utilizing various pseudorandom sequences and deterministic sequences. Optionally, techniques to support an easy-to-implement cell planning are described. Alternatively, uncoordinated allocation can also be supported by the mechanisms described herein.

Various uplink (UL) sequence hopping aspects are provided. The following design criteria may be applied:

Simple arithmetic to compute Physical Uplink Control Channel (PUCCH) and Physical Uplink Shared Channel (PUSCH) allocation parameters in every symbol Flexible PUCCH cyclic shift—orthogonal cover allocation. The hopping pattern is independent of the overall allocation strategy (CS-OC map). The UE determines its own initial parameter set; it does not need to determine what strategy was used to optimize the cyclic shift and orthogonal cover allocation.

A single set of rules for either the cell specific hopping or the resource specific hopping case At 310 of FIG. 3, sequence hopping considerations are provided. For the PUCCH and PUSCH, a set of possible reference signal (RS) sequences denoted by their sequence index can be defined for each possible resource block (RB) allocation case. In the case of the PUCCH, the same set of sequences can also be used to convey control information.

Assume the following:

For NRB≤5, there are 30 sequence indices available. There are 30 sequence groups, with one sequence in each group (numbers other than 30 can also be employed)

For NRB>5, there are 60 sequence indices available. There are 30 sequence groups with two sequences in each group Assume that there is a single downlink (DL) signaling bit informing the user equipment (UE) about whether sequence hopping should be used or not. In the following, sequence hopping and no hopping cases are described separately.

With sequence hopping disabled, the UE uses the PUSCH RS sequence index(es) corresponding to the signaled sequence group.

For NRB≤5, the UE uses a single sequence index (one of 30).

For NRB>5, the UE uses the first sequence index in the signaled sequence group in the first slot of the subframe and it uses the second sequence index in the signaled sequence group in the second slot of the subframe. Therefore, the UE alternates between the two sequences defined for the sequence group.

If it is desired to have more sequences (e.g., more than two) per sequence group for some NRB>5 then the UE cycles through the sequence indices in a similar manner. If there are m indices per sequence group, e.g., the set of indexes is {K0, K1, ..., KM−1} in a given sequence group, then in the Ith slot of a frame, the UE would use the sequence with index KIModM. In the first slot of a frame, K0 would be used.

When sequence hopping is disabled, the UE uses a single sequence based on the signaled sequence group for the RS and the control data modulation. The generic scrambling sequence generator (Gold sequence) can be used in order to generate the index hopping sequence. With sequence hopping enabled, the UE employs the PUSCH RS sequence index as determined by the scrambling sequence generator output. The sequence generator can be initialized at each subframe boundary and clocked once in each slot, for example. At initialization, the 33-bit seed sequence is constructed according to the following:

| Initializer Bit | | | | | | |
|---|---|---|---|---|---|---|
| B32 ... B30 | B29 ... B27 | B26 ... B13 | B12 ... B9 | B8 ... B0 | | |
| Value 0, 0, 0 | 0, 0, 1 | 0, 0, ..., 0 | Subframe_ID | Cell_ID | | |

Note that since the subframe ID is part of the initialization bits, the resulting sequence period is one frame (10 ms). Suppose the scrambling generator output is S0, S1, ..., S8-U where U is the number of slots per frame, then the PUSCH sequence index KI in slot I is determined as $$KI = \left(\sum_{L=0}^{7} s_{8 \cdot I + L} \cdot 2^L\right) \bmod (M \cdot 30)$$

(e.g., taking consecutive bytes of the scrambling sequence, one for each slot and take the corresponding integer value modulo the total number of sequence indices) where M is the number of sequences indices per sequence group. Note that:

$$M = \begin{cases} 1 & NRB \leq 5 \\ 2 & NRB > 5 \end{cases}$$

With sequence hopping enabled, the UE employs the PUCCH RS and control sequence index as determined by the scrambling sequence generator output. The sequence generator is initialized at each subframe boundary and clocked once for each symbol, for example. At initialization, the 33-bit seed sequence can be constructed according to the following:

| Initializer Bit | | | | | | |
|---|---|---|---|---|---|---|
| B32 ... B30 | B29 ... B27 | B26 ... B13 | B12 ... B9 | B8 ... B0 | | |
| Value 0, 0, 0 | 0, 0, 1 | 0, 0, ..., 0 | Subframe_ID | Cell_ID | | |

Note that the subframe ID is part of the initialization bits, the resulting sequence period is one frame (10 ms). Suppose the scrambling generator output is S0, S1, ..., S8-V where V is the number of symbols per frame, then the PUCCH CGS sequence index KI in symbol I is determined as $$KI = \left(\sum_{L=0}^{7} s_{8 \cdot I + L} \cdot 2^L\right) \bmod 30.$$

Note that from the sequence index generation purposes, the RS and control symbols within the PUCCH are not distinguished.

At 320 of FIG. 3, cell-specific shift hopping considerations are described. In general, cyclic shift hopping is not provided for the PUSCH RS. The cyclic shift is either explicitly signaled in the assignment or otherwise it is set to a static value conveyed by higher layer signaling. For the purpose of inter-cell interference randomization, a cell specific cyclic shift offset sequence can be provided. In order to simplify implementation, assume that for the cell specific cyclic shift application purposes, the RS and control symbols within the PUCCH are not distinguished. Let LI be the cyclic shift offset in symbol I. Assume LI∈{0, 1, 2, ..., 11} And if the cyclic shift in a symbol is UI before applying the cell specific cyclic shift offset then it will be (LI+UI) mod 12 after applying the cell specific cyclic shift offset. Two options for generating the LI are described in the following section.

In this case, the cyclic shift offset pattern depends on the Cell_ID, the cell specific cyclic shift offset can be determined by the scrambling sequence generator output. The sequence generator can be initialized at each subframe boundary and clocked once in each symbol. At initialization, the 33-bit seed sequence can constructed according to the following:

| Initializer Bit | | | | | | |
|---|---|---|---|---|---|---|
| B32 ... B30 | B29 ... B27 | B26 ... B13 | B12 ... B9 | B8 ... B0 | | |
| Value 0, 0, 0 | 0, 1, 0 | 0, 0, ..., 0 | Subframe_ID | Cell_ID | | |

Note that since the subframe ID is part of the initialization bits, the resulting sequence period is one frame (10 ms). Suppose the scrambling generator output is S0, S1, ..., S8-V where V is the number of symbols per frame, then the cell specific cyclic shift offset LI in symbol I is determined as $$LI = \left(\sum_{B=0}^{7} s_{8 \cdot I + B} \cdot 2^B\right) \bmod 12$$

e.g., taking consecutive bytes of the scrambling sequence, one for each symbol and take the corresponding integer value modulo 12.

The cyclic shift offset is generally the sum of two components; the first is a pseudo-random sequence dependent on the (secondary sequence) SSC_ID, while the second is a deterministic sequence dependent on the (primary sequence) PSC_ID. The purpose of this construction is to minimize the cyclic shift alignments in cells with the same SSC_ID. The pseudorandom cyclic shift offset component, TI is determined by the scrambling sequence generator output. The sequence generator is initialized at each subframe boundary and clocked once in every symbol, for example. At initialization, the 33-bit seed sequence can be constructed according to the following:

| Initializer Bit | | | | | |
|---|---|---|---|---|---|
| B32... B30 | B29...B27 | B26...B13 | B12...B9 | B8...B0 | |
| Value 0,0,0 | 0,1,1 | 0,0,...,0 | Subframe_ID | SSC_ID | |

Note that since the subframe ID is part of the initialization bits, the resulting sequence period is one frame (10 ms). Suppose the scrambling generator output is S0, S1, ..., S8-V where V is the number of symbols per frame, then the cell specific cyclic shift offset TI in symbol I is determined as $$TI = \left(\sum_{B=0}^{7} s_{8 \cdot I+B} \cdot 2^B\right) \mod 12$$

e.g., taking consecutive bytes of the scrambling sequence, one for each symbol and take the corresponding integer value modulo 12. The PSC_ID dependent deterministic cyclic shift offset value RJ 0≤J<12 is defined as:

$$(R0, R1, \ldots, R11) = \begin{cases} (0,0,0,0,0,0,0,0,0,0,0,0) & \text{if PSC\_ID}=0 \\ (0,1,3,7,2,5,11,10,8,4,9,6) & \text{if PSC\_ID}=1 \\ (0,12,10,6,11,8,2,3,5,9,4,7) & \text{if PSC\_ID}=2 \end{cases}$$

Note that a single formula is provided for generating the sequences above. Also note that the sum of RJ for PSC_ID=1 and PSC_ID=2 is zero modulo 13. For any pair of PSC_IDs, the element-wise shift differences are distinct. The cell specific cyclic shift offset LI in symbol I is determined as LI= (TI+RIMod6)mod 12

At 330 of FIG. 3, resource-specific cyclic shift hopping is provided. The resource specific cyclic shift hopping can be performed on a per symbol basis. The hopping pattern is based on a factor 3 decimation. The resource specific cyclic shift CJ in control data symbol J is determined as $$CJ = 2 \cdot ((\lfloor C0/2 \rfloor + 1) \cdot 3^{J+C0 \mod 2}) \mod 7 + C0 \mod 2$$

In the first symbol of every frame, J=0. After that, J is incremented by one for every control symbol but it is not incremented for RS symbols. The resource specific cyclic shift CK in RS symbol K is determined as $$CK = 2 \cdot ((\lfloor C0/2 \rfloor + 1) \cdot 3^{K+C0 \mod 2}) \mod 7 + C0 \mod 2$$

In the first RS symbol of the frame, K=0. After that, K is incremented by one for each RS symbol but it is not incremented for control data symbols.

At each slot boundary, the cyclic shift allocation is offset according to a deterministic pattern. The purpose of this is to maximize the distance in a new slot between resources that were sharing the same cyclic shift resource in the previous slot. Resource hopping is achieved by adding a slot and resource dependent cyclic shift offset $D_I^J$ for slot I and orthogonal cover index J. The cyclic shift offset $D_I^J$ for slot I and orthogonal cover index J is determined as $$D_I^J = \begin{cases} 0 & \text{if } J=0 \\ (2 \cdot I \cdot (J+1)) \mod 12 & \text{if } J>0 \end{cases}$$

For which the orthogonal cover index j is mapped to spreading sequences as shown below $$\begin{cases} J=0 & +1+1+1+1 \\ J=1 & +1-1+1-1 \\ J=2 & +1+1-1-1 \\ J=3 & +1-1-1+1 \end{cases}$$

The cyclic shift offset $D_I^J$ for slot I and orthogonal cover index J is determined as $$D_I^J = (4 \cdot I \cdot J) \mod 12$$

For which the orthogonal cover index j is mapped to spreading sequences as shown below $$\begin{cases} J=0 & 1 & 1 & 1 \\ J=1 & 1 & e^{I \cdot 2\pi/3} & e^{-I \cdot 2\pi/3} \\ J=2 & 1 & e^{-I \cdot 2\pi/3} & e^{I \cdot 2\pi/3} \end{cases}$$

At 340 of FIG. 3, orthogonal cover hopping aspects are provided. Generally, the orthogonal cover is changed at each slot boundary. The relationship between the orthogonal cover functions associated with a pair of PUCCH resources is generally the same across slot boundaries, however, a cell dependent linear offset can be applied to each orthogonal cover function. The offset implies that a cell specific cover function is added (element-wise multiply) to each orthogonal cove function used in the cell. This approach preserves the optimum distribution of orthogonal covers that may have been used. The cell specific orthogonal cover offset index is determined by the scrambling sequence generator output. The sequence generator is initialized at every subframe boundary and clocked once in every slot. At initialization, the [33]-bit seed sequence can be constructed according to the following:

| Initializer Bit | | | | | |
|---|---|---|---|---|---|
| B32... B30 | B29...B27 | B26...B13 | B12...B9 | B8...B0 | |
| Value 0,0,0 | 1,0,0 | 0,0,...,0 | Subframe_ID | Cell_ID | |

Note that since the subframe ID is part of the initialization bits, the resulting sequence period is one frame (10 ms). Suppose the scrambling generator output is S0, S1, ..., S8-U where U is the number of slots per frame, then the cell specific orthogonal cover offset index DI for the ACK data in slot I is determined as $$DI = \left(\sum_{B=0}^{7} s_{8 \cdot I+B} \cdot 2^B\right) \mod 4$$

while the cell specific orthogonal cover offset index EI for the RS in slot I is determined as $$EI = \left(\sum_{B=0}^{7} s_{8 \cdot I+B} \cdot 2^B\right) \mod 3$$

Then the actual applied orthogonal cover is the sum (element-wise product) of the initial assigned orthogonal cover and the orthogonal cover function indicated by DI and EI for the ACK data and ACK RS, respectively.

Figure 4:
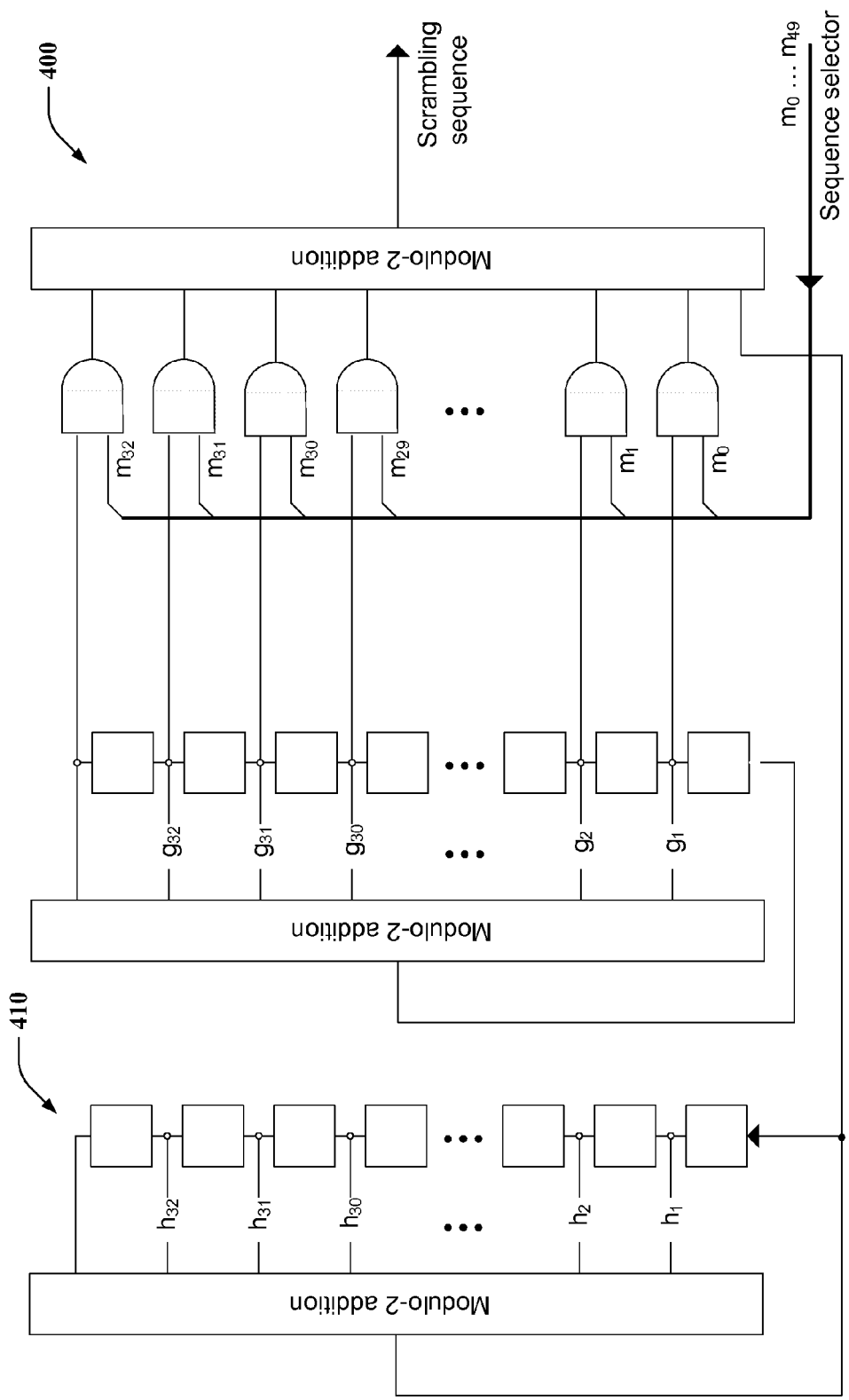
FIG. 4 illustrates an alternative scrambling sequence generator.

Referring to FIG. 4, an example alternative sequence generator 400 is illustrated. For various purposes, pseudorandom sequences can be used in the sequence hopping pattern generation. For this purpose, the structure shown in FIG. 4 can be used, where an h vector can be employed at 410. A shorter sequence generator could be used as well. The advantage of the structure shown in FIG. 4 is that a single generator can be used to generate all pseudorandom sequences. Various UL sequence hopping applications have been described. In general, a solution for both cell-specific and resource specific cyclic shift hopping is provided. This includes sequence index hopping pattern details and cell-coordinated cyclic shift hopping patterns. A cell-specific orthogonal cover offset index hopping pattern can also be provided. Simple arithmetic can be employed to compute PUCCH and PUSCH allocation parameters in the respective symbols. Use of a scrambling generator for various pseudo-random sequences can be employed. Flexible PUCCH cyclic shift—orthogonal cover allocation can also be provided. The hopping pattern can be independent of the overall allocation strategy. The UE needs to determine its own initial parameter set; it does not need to determine what strategy was used to optimize the cyclic shift and orthogonal cover allocation. A single set of rules for either the cell specific hopping or the resource specific hopping case can be provided. These aspects can be applied to UL DM RS and PUCCH randomization specification in LTE, for example.

Figure 5:
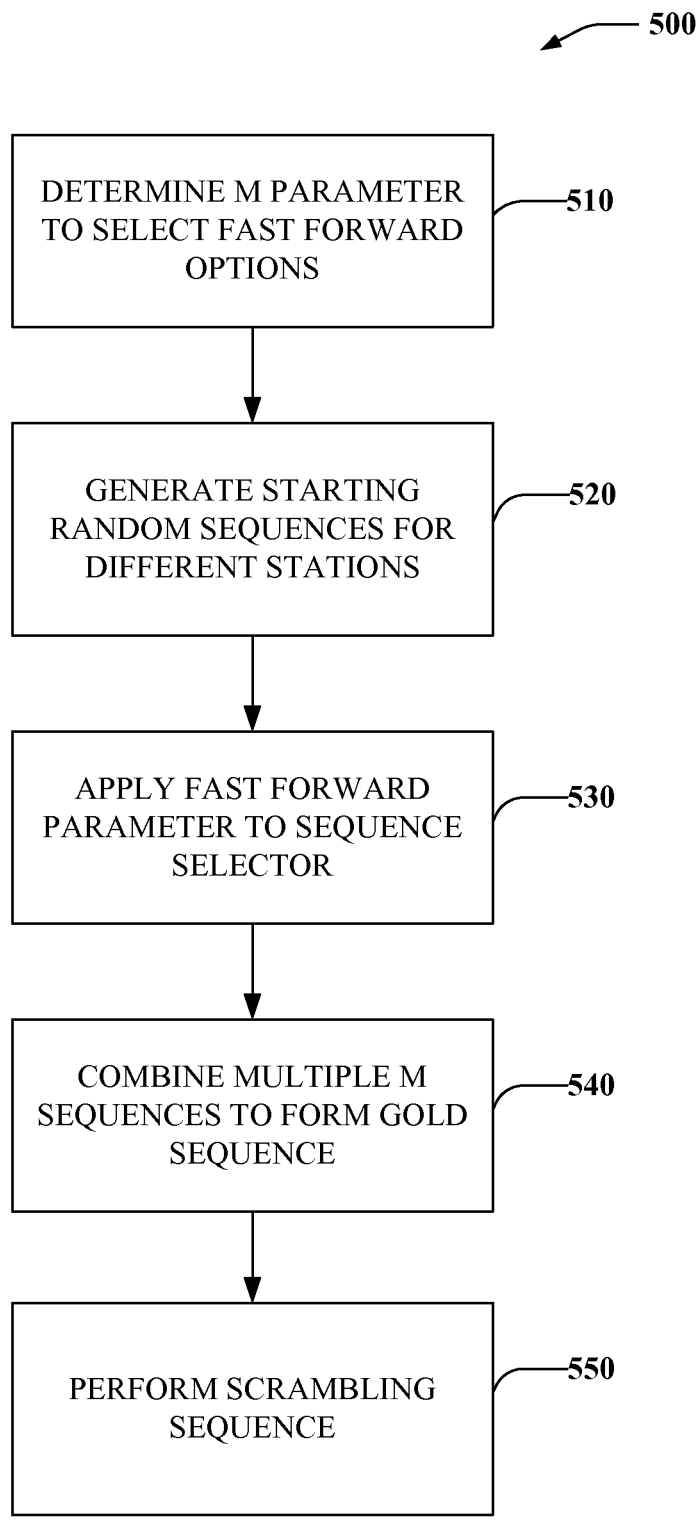
FIG. 5 illustrates a wireless communications method for scrambling sequence generation.

Referring now to FIG. 5, a wireless communications methodology 500 is illustrated. While, for purposes of simplicity of explanation, the methodology (and other methodologies described herein) are shown and described as a series of acts, it is to be understood and appreciated that the methodologies are not limited by the order of acts, as some acts may, in accordance with one or more embodiments, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be utilized to implement a methodology in accordance with the claimed subject matter.

Proceeding to 510, an m-parameter is determined to select fast-forwarding operations. As noted previously, binary m-sequences can be employed as base-level scrambling codes. In one example, a 50 digit binary value can be employed by other values are also possible. At 520, different starting random sequences are selected. As noted previously, these values can be assigned for differing baser stations. Also, g-parameters or polynomials can be selected as noted above for the random sequences. At 530, the fast forward parameter at 510 is applied to a sequence selector. This can be applied via a collection of gates for example that apply the fast forward parameter to a modulo-2 adder for example. At 540, multiple m-sequences are combined to form a desired Gold sequence. For example, two (or more) m-sequences can be combined via an exclusive OR (XOR) operation to form the Gold sequence. At 550, a scrambling sequence is performed by shifting the combination of the m-parameters and the g-parameters described above.

In some cases, the use of multiple XOR operations for obtaining each new register output value can represent an undesirable degree of complexity. In these cases, it is advantageous to perform fast forwarding of the pseudorandom sequences by setting the shift register stage to the desired future state. That state depends on the generating polynomial (g-parameters), the number of steps of fast forward required and the initial state. Since the future register state depends on the initial state, the future state for each possible initial state should be stored or obtained by some other means. One possible method for this is to use the m-parameters to generate a consecutive sequence of bits occurring just before the desired future state and then employ those bits and use them to initialize the shift registers. In this manner, the number of times the m-parameter controlled XOR operation is to be performed can be reduced from the length of the desired sequence to the length of the shift registers. This method can be efficient since the m-parameter to be used depends on the g-parameter and the time shift value but it does not depend on the sift register initial state. Therefore, storing a single m-parameter is sufficient for a given time advance.

The techniques described herein may be implemented by various means. For example, these techniques may be implemented in hardware, software, or a combination thereof. For a hardware implementation, the processing units may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof. With software, implementation can be through modules (e.g., procedures, functions, and so on) that perform the functions described herein. The software codes may be stored in memory unit and executed by the processors.

Figure 6:
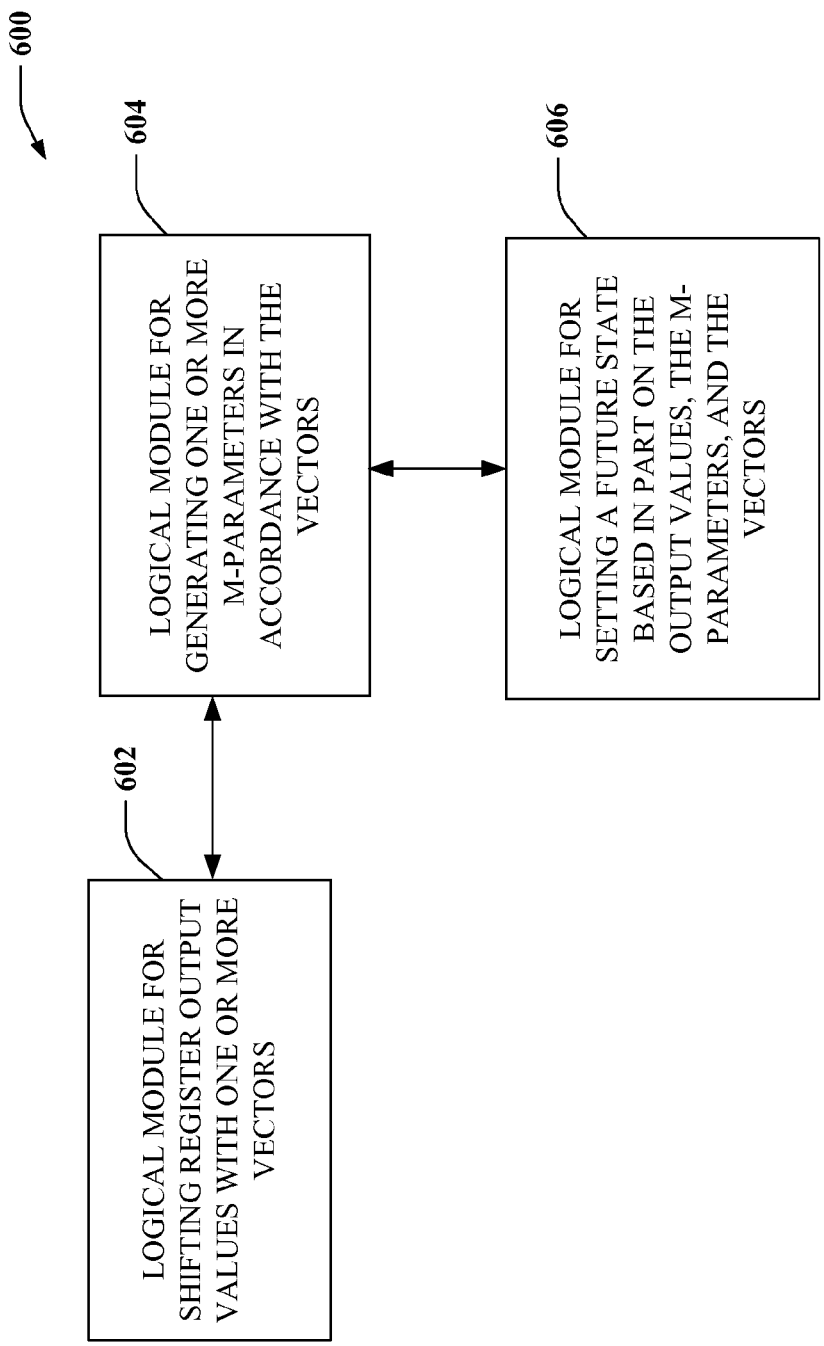
FIG. 6 illustrates an example logical module for a wireless protocol.
Figure 7:
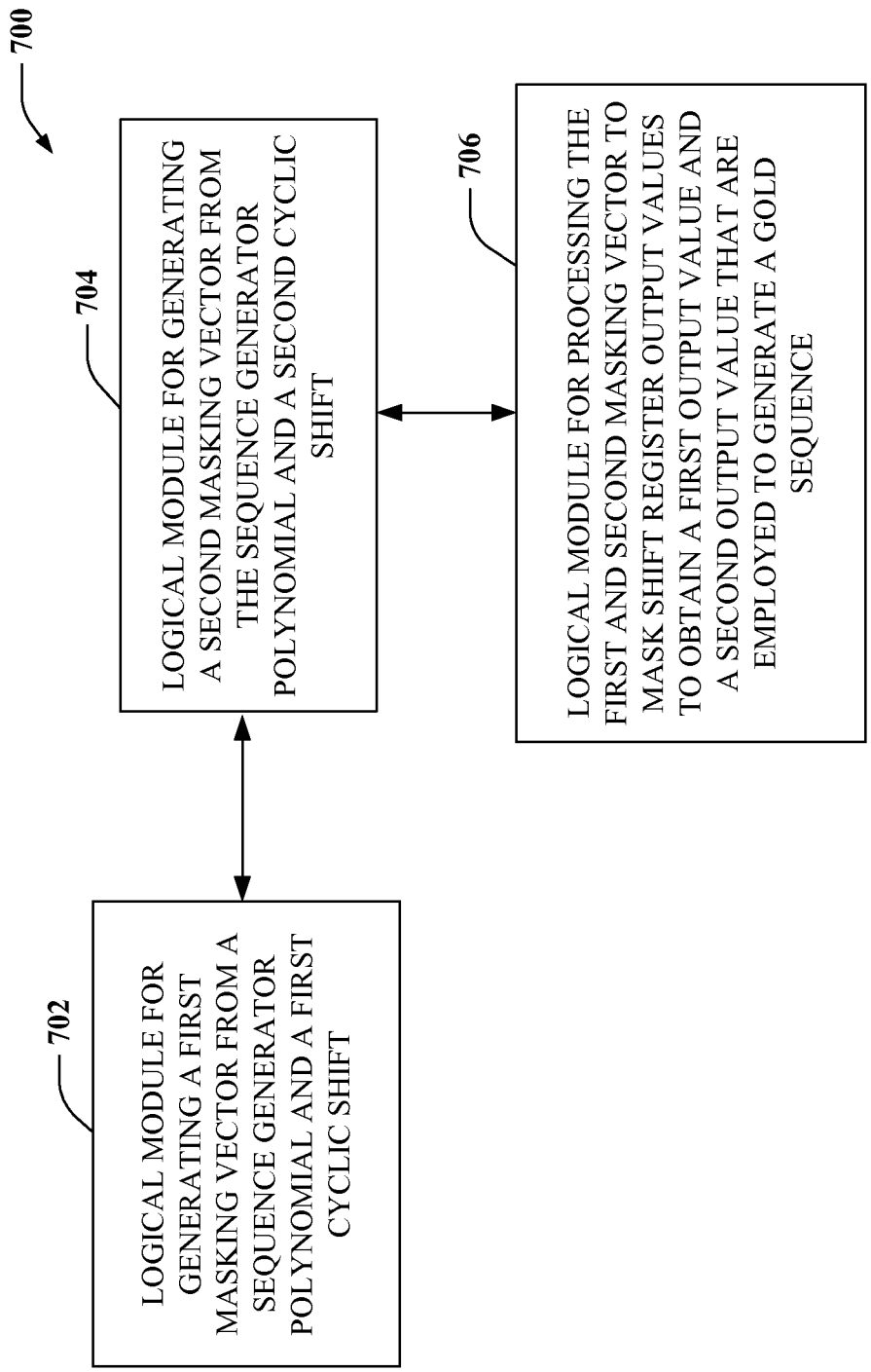
FIG. 7 illustrates an example logical module for an alternative wireless protocol.

Turning now to FIGS. 6 and 7, a system is provided that relates to wireless signal processing. The systems are represented as a series of interrelated functional blocks, which can represent functions implemented by a processor, software, hardware, firmware, or any suitable combination thereof.

Referring to FIG. 6, a wireless communication system 600 is provided. The system 600 includes a logical module 602 for shifting register output values with one or more vectors and a logical module 604 for generating one or more m-parameters in accordance with the vectors. The system 600 also includes a logical module 606 for setting a future state based in part on the output values, the m-parameters, and the vectors.

Referring to FIG. 7, a wireless communication system 700 is provided. The system 700 includes a logical module 702 for generating a first masking vector from a sequence generator polynomial and a first cyclic shift and a logical module 704 for generating a second masking vector from the sequence generator polynomial and a second cyclic shift. The system 700 also includes a logical module 706 for processing the first and second masking vector to mask shift register output values to obtain a first output value and a second output value that are employed to generate a Gold sequence.

Figure 8:
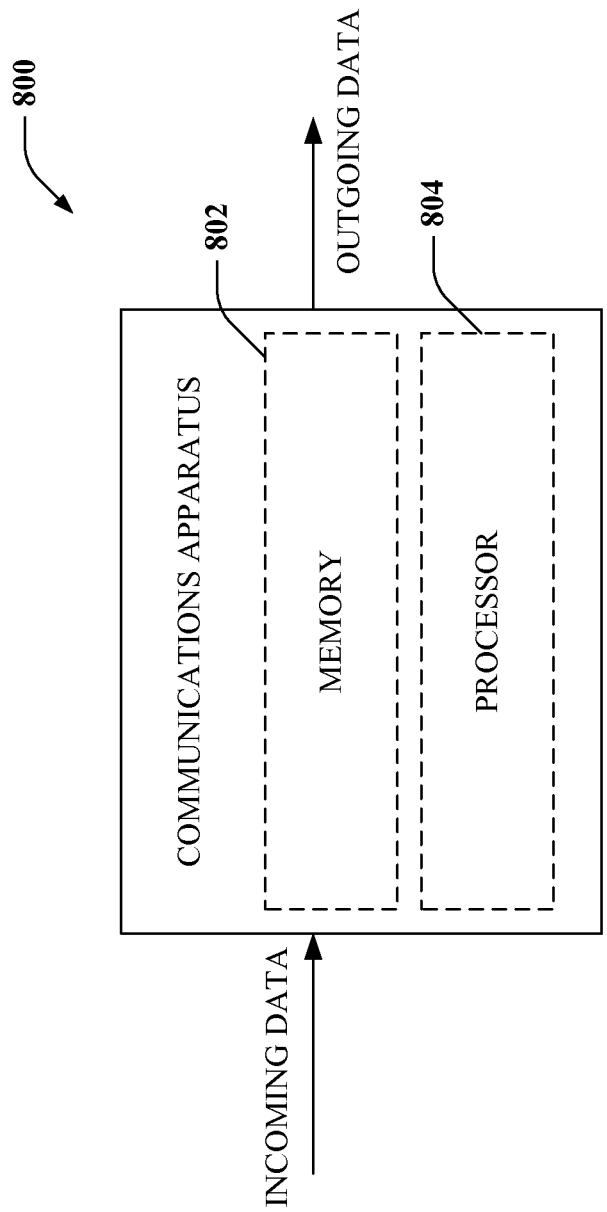
FIG. 8 illustrates an example communications apparatus that employs a wireless protocol.

FIG. 8 illustrates a communications apparatus 800 that can be a wireless communications apparatus, for instance, such as a wireless terminal. Additionally or alternatively, communications apparatus 800 can be resident within a wired network. Communications apparatus 800 can include memory 802 that can retain instructions for performing a signal analysis in a wireless communications terminal. Additionally, communications apparatus 800 may include a processor 804 that can execute instructions within memory 802 and/or instructions received from another network device, wherein the instructions can relate to configuring or operating the communications apparatus 800 or a related communications apparatus.

Figure 9:
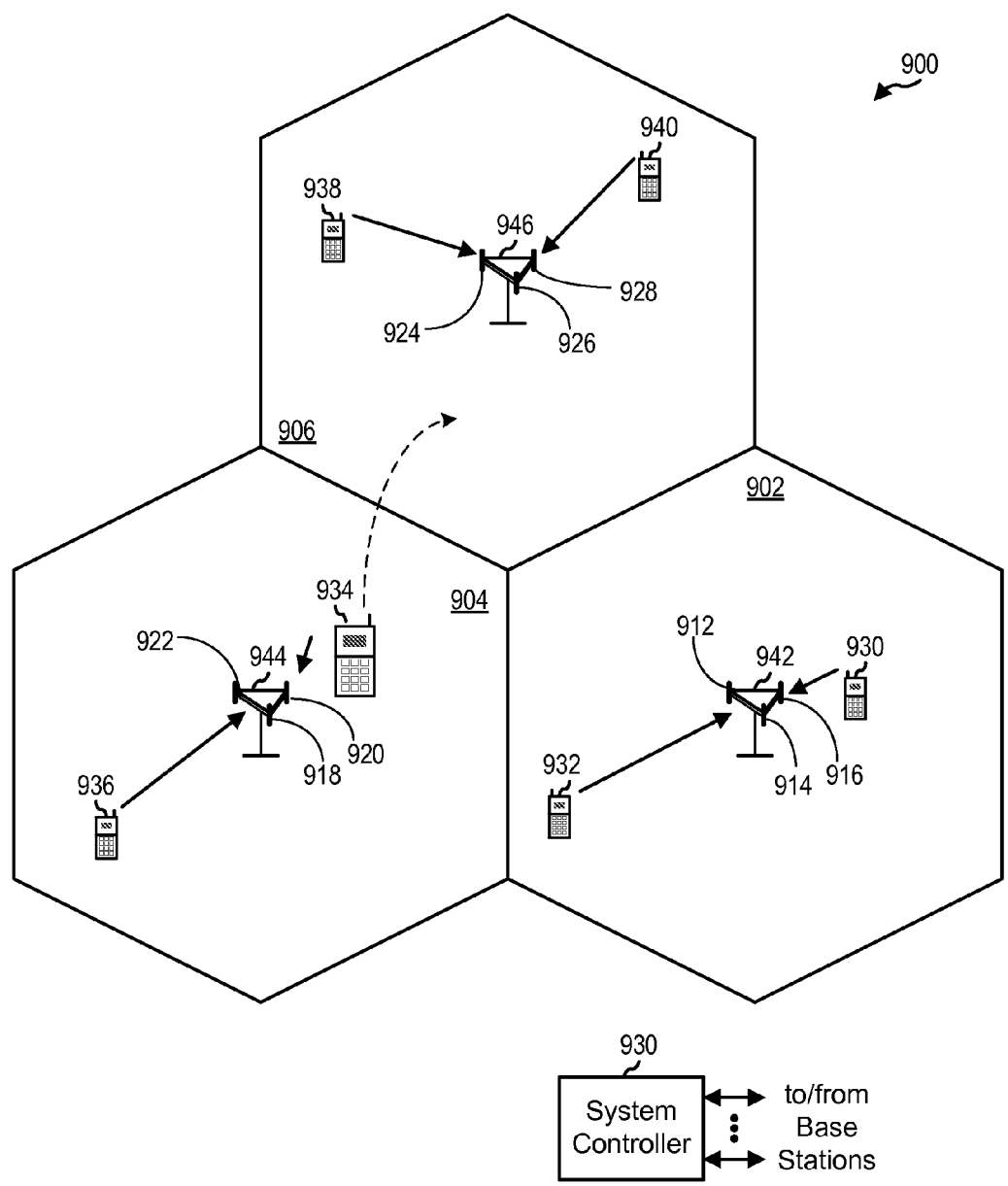
FIG. 9 illustrates a multiple access wireless communication system.

Referring to FIG. 9, a multiple access wireless communication system 900 is illustrated. The multiple access wireless communication system 900 includes multiple cells, including cells 902, 904, and 906. In the aspect the system 900, the cells 902, 904, and 906 may include a Node B that includes multiple sectors. The multiple sectors can be formed by groups of antennas with each antenna responsible for communication with UEs in a portion of the cell. For example, in cell 902, antenna groups 912, 914, and 916 may each correspond to a different sector. In cell 904, antenna groups 918, 920, and 922 each correspond to a different sector. In cell 906, antenna groups 924, 926, and 928 each correspond to a different sector. The cells 902, 904 and 906 can include several wireless communication devices, e.g., User Equipment or UEs, which can be in communication with one or more sectors of each cell 902, 904 or 906. For example, UEs 930 and 932 can be in communication with Node B 942, UEs 934 and 936 can be in communication with Node B 944, and UEs 938 and 940 can be in communication with Node B 946.

Figure 10:
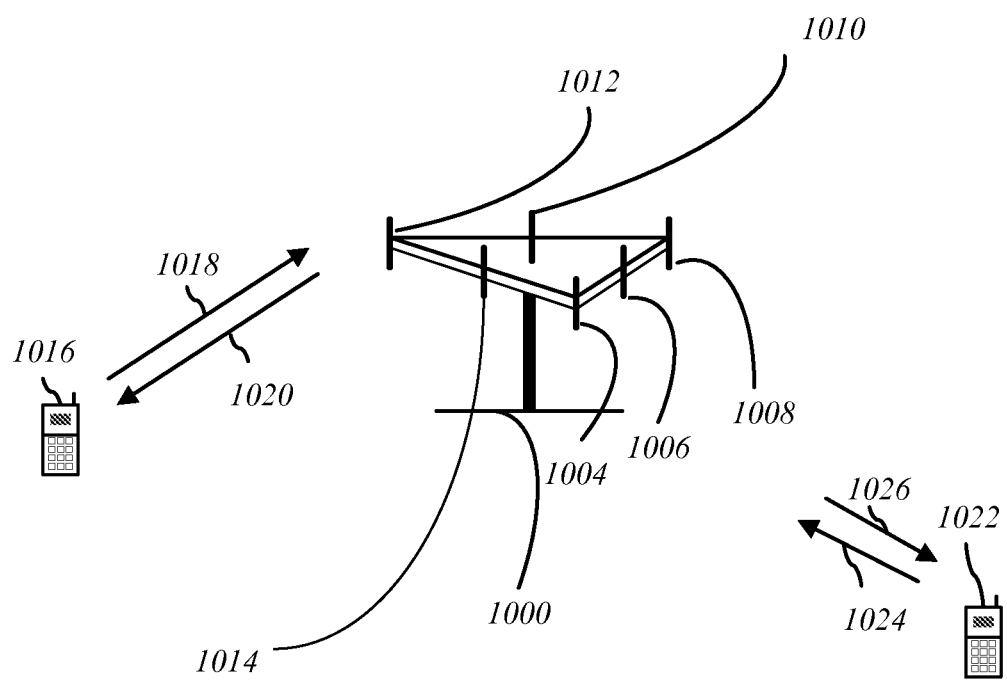
FIGS. 10 and 11 illustrate example communications systems.

Referring now to FIG. 10, a multiple access wireless communication system according to one aspect is illustrated. An access point 1000 (AP) includes multiple antenna groups, one including 1004 and 1006, another including 1008 and 1010, and an additional including 1012 and 1014. In FIG. 10, only two antennas are shown for each antenna group, however, more or fewer antennas may be utilized for each antenna group. Access terminal 1016 (AT) is in communication with antennas 1012 and 1014, where antennas 1012 and 1014 transmit information to access terminal 1016 over forward link 1020 and receive information from access terminal 1016 over reverse link 1018. Access terminal 1022 is in communication with antennas 1006 and 1008, where antennas 1006 and 1008 transmit information to access terminal 1022 over forward link 1026 and receive information from access terminal 1022 over reverse link 1024. In a FDD system, communication links 1018, 1020, 1024 and 1026 may use different frequency for communication. For example, forward link 1020 may use a different frequency then that used by reverse link 1018.

Each group of antennas and/or the area in which they are designed to communicate is often referred to as a sector of the access point. Antenna groups each are designed to communicate to access terminals in a sector, of the areas covered by access point 1000. In communication over forward links 1020 and 1026, the transmitting antennas of access point 1000 utilize beam-forming in order to improve the signal-to-noise ratio of forward links for the different access terminals 1016 and 1024. Also, an access point using beam-forming to transmit to access terminals scattered randomly through its coverage causes less interference to access terminals in neighboring cells than an access point transmitting through a single antenna to all its access terminals. An access point may be a fixed station used for communicating with the terminals and may also be referred to as an access point, a Node B, or some other terminology. An access terminal may also be called an access terminal, user equipment (UE), a wireless communication device, terminal, access terminal or some other terminology.

Figure 11:
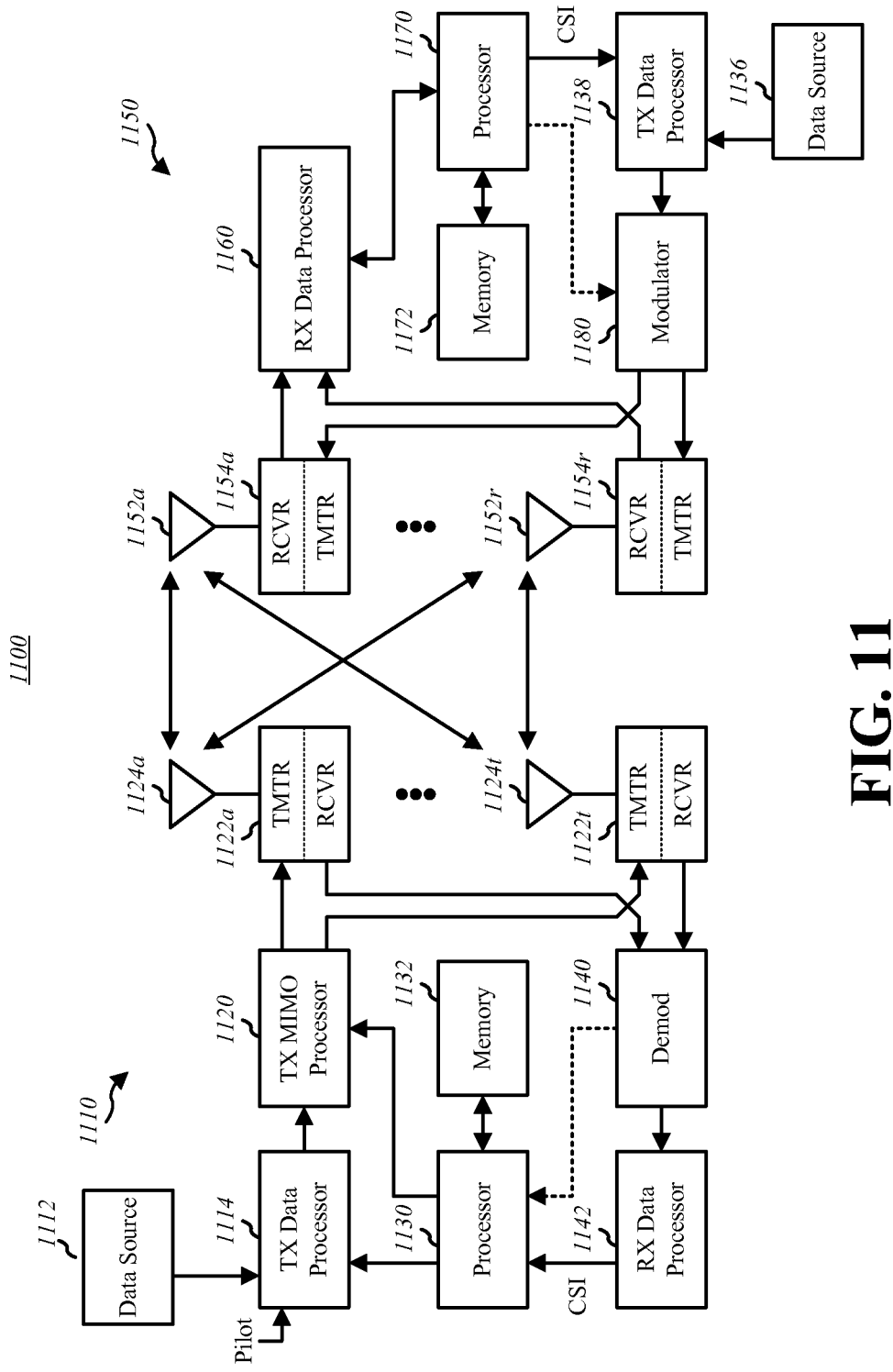

Referring to FIG. 11, a system 1100 illustrates a transmitter system 210 (also known as the access point) and a receiver system 1150 (also known as access terminal) in a MIMO system 1100. At the transmitter system 1110, traffic data for a number of data streams is provided from a data source 1112 to a transmit (TX) data processor 1114. Each data stream is transmitted over a respective transmit antenna. TX data processor 1114 formats, codes, and interleaves the traffic data for each data stream based on a particular coding scheme selected for that data stream to provide coded data.

The coded data for each data stream may be multiplexed with pilot data using OFDM techniques. The pilot data is typically a known data pattern that is processed in a known manner and may be used at the receiver system to estimate the channel response. The multiplexed pilot and coded data for each data stream is then modulated (i.e., symbol mapped) based on a particular modulation scheme (e.g., BPSK, QSPK, M-PSK, or M-QAM) selected for that data stream to provide modulation symbols. The data rate, coding, and modulation for each data stream may be determined by instructions performed by processor 1130.

The modulation symbols for all data streams are then provided to a TX MIMO processor 1120, which may further process the modulation symbols (e.g., for OFDM). TX MIMO processor 1120 then provides NT modulation symbol streams to NT transmitters (TMTR) 1122a through 1122t. In certain embodiments, TX MIMO processor 1120 applies beam-forming weights to the symbols of the data streams and to the antenna from which the symbol is being transmitted.

Each transmitter 1122 receives and processes a respective symbol stream to provide one or more analog signals, and further conditions (e.g., amplifies, filters, and up-converts) the analog signals to provide a modulated signal suitable for transmission over the MIMO channel. NT modulated signals from transmitters 1122a through 1122t are then transmitted from NT antennas 1124a through 1124t, respectively.

At receiver system 1150, the transmitted modulated signals are received by NR antennas 1152a through 1152r and the received signal from each antenna 1152 is provided to a respective receiver (RCVR) 1154a through 1154r. Each receiver 1154 conditions (e.g., filters, amplifies, and down-converts) a respective received signal, digitizes the conditioned signal to provide samples, and further processes the samples to provide a corresponding "received" symbol stream.

An RX data processor 1160 then receives and processes the NR received symbol streams from NR receivers 1154 based on a particular receiver processing technique to provide NT "detected" symbol streams. The RX data processor 1160 then demodulates, de-interleaves, and decodes each detected symbol stream to recover the traffic data for the data stream. The processing by RX data processor 1160 is complementary to that performed by TX MIMO processor 1120 and TX data processor 1114 at transmitter system 1110.

A processor 1170 periodically determines which pre-coding matrix to use (discussed below). Processor 1170 formulates a reverse link message comprising a matrix index portion and a rank value portion. The reverse link message may comprise various types of information regarding the communication link and/or the received data stream. The reverse link message is then processed by a TX data processor 1138, which also receives traffic data for a number of data streams from a data source 1136, modulated by a modulator 1180, conditioned by transmitters 1154a through 1154r, and transmitted back to transmitter system 1110.

At transmitter system 1110, the modulated signals from receiver system 1150 are received by antennas 1124, conditioned by receivers 1122, demodulated by a demodulator 1140, and processed by a RX data processor 1142 to extract the reserve link message transmitted by the receiver system 1150. Processor 1130 then determines which pre-coding matrix to use for determining the beam-forming weights then processes the extracted message.

In an aspect, logical channels are classified into Control Channels and Traffic Channels. Logical Control Channels comprises Broadcast Control Channel (BCCH) which is DL channel for broadcasting system control information. Paging Control Channel (PCCH) which is DL channel that transfers paging information. Multicast Control Channel (MCCH) which is Point-to-multipoint DL channel used for transmitting Multimedia Broadcast and Multicast Service (MBMS) scheduling and control information for one or several MTCHs. Generally, after establishing RRC connection this channel is only used by UEs that receive MBMS (Note: old MCCH+MSCH). Dedicated Control Channel (DCCH) is Point-to-point bi-directional channel that transmits dedicated control information and used by UEs having an RRC connection. Logical Traffic Channels comprise a Dedicated Traffic Channel (DTCH) which is Point-to-point bi-directional channel, dedicated to one UE, for the transfer of user information. Also, a Multicast Traffic Channel (MTCH) for Point-to-multipoint DL channel for transmitting traffic data.

Transport Channels are classified into DL and UL. DL Transport Channels comprises a Broadcast Channel (BCH), Downlink Shared Data Channel (DL-SDCH) and a Paging Channel (PCH), the PCH for support of UE power saving (DRX cycle is indicated by the network to the UE), broadcasted over entire cell and mapped to PHY resources which can be used for other control/traffic channels. The UL Transport Channels comprises a Random Access Channel (RACH), a Request Channel (REQCH), an Uplink Shared Data Channel (UL-SDCH) and plurality of PHY channels. The PHY channels comprise a set of DL channels and UL channels.

The DL PHY channels comprises: Common Pilot Channel (CPICH), Synchronization Channel (SCH), Common Control Channel (CCCH), Shared DL Control Channel (SDCCH), Multicast Control Channel (MCCH), Shared UL Assignment Channel (SUACH), Acknowledgement Channel (ACKCH), DL Physical Shared Data Channel (DL-PSDCH), UL Power Control Channel (UPCCH), Paging Indicator Channel (PICH), and Load Indicator Channel (LICH), for example.

The UL PHY Channels comprises: Physical Random Access Channel (PRACH), Channel Quality Indicator Channel (CQICH), Acknowledgement Channel (ACKCH), Antenna Subset Indicator Channel (ASICH), Shared Request Channel (SREQCH), UL Physical Shared Data Channel (UL-PSDCH), and Broadband Pilot Channel (BPICH), for example.

Other terms/components include: 3G 3rd Generation, 3GPP 3rd Generation Partnership Project, ACLR Adjacent channel leakage ratio, ACPR Adjacent channel power ratio, ACS Adjacent channel selectivity, ADS Advanced Design System, AMC Adaptive modulation and coding, A-MPR Additional maximum power reduction, ARQ Automatic repeat request, BCCH Broadcast control channel, BTS Base transceiver station, CDD Cyclic delay diversity, CCDF Complementary cumulative distribution function, CDMA Code division multiple access, CFI Control format indicator, Co-MIMO Cooperative MIMO, CP Cyclic prefix, CPICH Common pilot channel, CPRI Common public radio interface, CQI Channel quality indicator, CRC Cyclic redundancy check, DCI Downlink control indicator, DFT Discrete Fourier transform, DFT-SOFDM Discrete Fourier transform spread OFDM, DL Downlink (base station to subscriber transmission), DL-SCH Downlink shared channel, D-PHY 500 Mbps physical layer, DSP Digital signal processing, DT Development toolset, DVSA Digital vector signal analysis, EDA Electronic design automation, E-DCH Enhanced dedicated channel, E-UTRAN Evolved UMTS terrestrial radio access network, eMBMS Evolved multimedia broadcast multicast service, eNB Evolved Node B, EPC Evolved packet core, EPRE Energy per resource element, ETSI European Telecommunications Standards Institute, E-UTRA Evolved UTRA, E-UTRAN Evolved UTRAN, EVM Error vector magnitude, and FDD Frequency division duplex.

Still yet other terms include FFT Fast Fourier transform, FRC Fixed reference channel, FS1 Frame structure type 1, FS2 Frame structure type 2, GSM Global system for mobile communication, HARQ Hybrid automatic repeat request, HDL Hardware description language, HI HARQ indicator, HSDPA High speed downlink packet access, HSPA High speed packet access, HSUPA High speed uplink packet access, IFFT Inverse FFT, IOT Interoperability test, IP Internet protocol, LO Local oscillator, LTE Long term evolution, MAC Medium access control, MBMS Multimedia broadcast multicast service, MBSFN Multicast/broadcast over single-frequency network, MCH Multicast channel, MIMO Multiple input multiple output, MISO Multiple input single output, MME Mobility management entity, MOP Maximum output power, MPR Maximum power reduction, MU-MIMO Multiple user MIMO, NAS Non-access stratum, OBSAI Open base station architecture interface, OFDM Orthogonal frequency division multiplexing, OFDMA Orthogonal frequency division multiple access, PAPR Peak-to-average power ratio, PAR Peak-to-average ratio, PBCH Physical broadcast channel, P-CCPCH Primary common control physical channel, PCFICH Physical control format indicator channel, PCH Paging channel, PDCCH Physical downlink control channel, PDCP Packet data convergence protocol, PDSCH Physical downlink shared channel, PHICH Physical hybrid ARQ indicator channel, PHY Physical layer, PRACH Physical random access channel, PMCH Physical multicast channel, PMI Pre-coding matrix indicator, P-SCH Primary synchronization signal, PUCCH Physical uplink control channel, and PUSCH Physical uplink shared channel.

Other terms include QAM Quadrature amplitude modulation, QPSK Quadrature phase shift keying, RACH Random access channel, RAT Radio access technology, RB Resource block, RF Radio frequency, RFDE RF design environment, RLC Radio link control, RMC Reference measurement channel, RNC Radio network controller, RRC Radio resource control, RRM Radio resource management, RS Reference signal, RSCP Received signal code power, RSRP Reference signal received power, RSRQ Reference signal received quality, RSSI Received signal strength indicator, SAE System architecture evolution, SAP Service access point, SC-FDMA Single carrier frequency division multiple access, SFBC Space-frequency block coding, S-GW Serving gateway, SIMO Single input multiple output, SISO Single input single output, SNR Signal-to-noise ratio, SRS Sounding reference signal, S-SCH Secondary synchronization signal, SU-MIMO Single user MIMO, TDD Time division duplex, TDMA Time division multiple access, TR Technical report, TrCH Transport channel, TS Technical specification, TTA Telecommunications Technology Association, TTI Transmission time interval, UCI Uplink control indicator, UE User equipment, UL Uplink (subscriber to base station transmission), UL-SCH Uplink shared channel, UMB Ultra-mobile broadband, UMTS Universal mobile telecommunications system, UTRA Universal terrestrial radio access, UTRAN Universal terrestrial radio access network, VSA Vector signal analyzer, W-CDMA Wideband code division multiple access It is noted that various aspects are described herein in connection with a terminal. A terminal can also be referred to as a system, a user device, a subscriber unit, subscriber station, mobile station, mobile device, remote station, remote terminal, access terminal, user terminal, user agent, or user equipment. A user device can be a cellular telephone, a cordless telephone, a Session Initiation Protocol (SIP) phone, a wireless local loop (WLL) station, a PDA, a handheld device having wireless connection capability, a module within a terminal, a card that can be attached to or integrated within a host device (e.g., a PCMCIA card) or other processing device connected to a wireless modem.

Moreover, aspects of the claimed subject matter may be implemented as a method, apparatus, or article of manufacture using standard programming and/or engineering techniques to produce software, firmware, hardware, or any combination thereof to control a computer or computing components to implement various aspects of the claimed subject matter. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Additionally it should be appreciated that a carrier wave can be employed to carry computer-readable electronic data such as those used in transmitting and receiving voice mail or in accessing a network such as a cellular network. Of course, those skilled in the art will recognize many modifications may be made to this configuration without departing from the scope or spirit of what is described herein.

As used in this application, the terms "component," "module," "system," "protocol," and the like are intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers.

What has been described above includes examples of one or more embodiments. It is, of course, not possible to describe every conceivable combination of components or methodologies for purposes of describing the aforementioned embodiments, but one of ordinary skill in the art may recognize that many further combinations and permutations of various embodiments are possible. Accordingly, the described embodiments are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A wireless communications method, comprising:
    employing a processor executing computer executable instructions stored on a computer readable storage medium to implement the following acts:
    generating cyclic shifts for a sequence generator by masking output values from a shift register with one or more masking vectors;
    generating one or more m-parameters for the sequence generator in accordance with the one or more masking vectors, wherein different mask values are applied to at least two sets of the one or more m-parameters; and
    forwarding the sequence generator to a desired future sequence state based in part on the output values, the generated one or more m-parameters, and the one or more masking vectors, wherein forwarding the sequence generator to a desired future sequence state comprises:
        generating a sequence of bits occurring just before the desired future sequence state, using the one or more m-parameters; and
        employing the generated sequence of bits to initialize the shift register.

2. The method of claim 1, the vectors are associated with a multi-bit polynomial.

3. The method of claim 1, wherein the one or more m-parameters are combined as a set to form a Gold sequence.

4. The method of claim 3, the Gold sequence is formed by an exclusive OR operation of at least two sets of the one or more m-parameters.

5. The method of claim 1, further comprising generating the cyclic shifts via a modulo-2 adder.

6. The method of claim 5, generating an additional polynomial value via the modulo-2 adder.

7. The method of claim 1, further comprising generating one or more sequence hopping functions.

8. The method of claim 1, further comprising generating one or more cell-specific sequence hopping functions.

9. The method of claim 1, further comprising generating one or more resource specific sequence hopping functions.

10. The method of claim 1, further comprising generating one or more orthogonal cover hopping functions.

11. The method of claim 1, further comprising applying an index hopping sequence if sequence hopping is enabled.

12. A communications apparatus, comprising:
    a memory that retains instructions for generating cyclic shifts for a sequence generator by combining output values from a shift register with one or more masking vectors, generating one or more m-parameters for the sequence generator in accordance with the one or more masking vectors, wherein different mask values are applied to at least two sets of the one or more m-parameters, and starting the sequence generator at a desired future state based in part on the output values, the generated one or more m-parameters and the one or more masking vectors, wherein the instructions for starting the sequence generator at a desired future state comprise instructions for generating a sequence of bits occurring just before the desired future state, using the one or more parameters, and employing the generated sequence of bits to initialize the shift register; and
    a processor that executes the instructions.

13. The apparatus of claim 12, wherein the one or more m-parameters are combined as a set to form a Gold sequence.

14. The apparatus of claim 13, the Gold sequence is formed by an exclusive OR operation of at least two sets of the one or more m-parameters.

15. The apparatus of claim 12, further comprising a modulo-2 adder to generate the cyclic shifts.

16. A communications apparatus, comprising:
    means for shifting output values from a register with one or more masking vectors;
    means for generating one or more m-parameters in accordance with the one or more masking vectors, wherein different mask values are applied to at least two sets of the one or more m-parameters; and
    means for setting a desired future sequence state based in part on the output values, the generated one or more m-parameters, and the one or more masking vectors, wherein the means for setting a desired future sequence state is configured to:
  generate a sequence of bits occurring just before the desired future sequence state, using the one or more m-parameters; and
  employ the generated sequence of bits to initialize the shift register.

17. The apparatus of claim 16, wherein the one or more m-parameters are associated with a set of sequences that are employed to form a Gold sequence.

18. A non-transitory computer-readable medium, comprising instructions for:
  masking output values from a shift register with one or more masking vectors;
  generating one or more m-parameters in accordance with the one or more masking vectors, wherein different mask values are applied to at least two sets of the one or more m-parameters; and
  setting a sequence generator to a desired future sequence state based in part on the output values, the generated one or more m-parameters, and the one or more masking vectors, wherein the instructions for setting a sequence generator to a desired future sequence state comprises instructions for:
    generating a sequence of bits occurring just before the desired future sequence state, using the one or more m-parameters; and
    employing the generated sequence of bits to initialize the shift register.

19. The computer-readable medium of claim 18, employing an adder to perform a cyclic shift operation.

20. The computer-readable medium of claim 18, further comprising configuring the sequence generator via a polynomial value.

21. A processor that executes the following instructions for:
  adjusting output values from a shift register according to one or more masking vectors;
  sequencing one or more m-parameters with the one or more masking vectors, wherein different mask values are applied to at least two sets of the one or more m-parameters; and
  clocking a sequence generator to a desired future sequence state based in part on the output values, the sequenced one or more m-parameters, and the one or more masking vectors, wherein the instructions for clocking a sequence generator to a desired future sequence state comprises instructions for:
    generating a sequence of bits occurring just before the desired future sequence state, using the one or more m-parameters; and
    employing the generated sequence of bits to initialize the shift register.

22. The processor of claim 21, further comprising generating a Gold sequence from at least two m-sequences.

23. A wireless communication method, comprising:
  employing a processor executing computer executable instructions stored on a computer readable storage medium to implement the following acts:
    generating a first masking vector from a sequence generator polynomial and a first cyclic shift;
    generating a second masking vector from the sequence generator polynomial and a second cyclic shift;
    generating one or more m-parameters in accordance with the first and second masking vectors, wherein different mask values are applied to at least two sets of the one or more m-parameters; and
    employing the first and second masking vector to mask output values from a shift register to obtain a first output value and a second output value,
  the first output value, the second output value, the masking vectors and the generated one or more m-parameters employed to generate a desired future sequence state, wherein generating the desired future sequence state comprises:
    generating a sequence of bits occurring just before the desired future sequence state, using the one or more m-parameters; and
    employing the generated sequence of bits to initialize the shift register.

24. The method of claim 23, further comprising adding results of the first output value to create a first random sequence.

25. The method of claim 23, further comprising adding results of the second output value to create a second random sequence.

26. An apparatus operable in wireless communication system, comprising:
  means for generating a first masking vector from a sequence generator polynomial and a first cyclic shift;
  means for generating a second masking vector from the sequence generator polynomial and a second cyclic shift;
  means for generating one or more m-parameters in accordance with the first and second masking vectors, wherein different mask values are applied to at least two sets of the one or more m-parameters; and
  means for processing the first and second masking vector to mask output values from a shift register to obtain a first output value and a second output value that are employed with the masking vectors and the generated one or more m-parameters to generate a desired future sequence state, wherein the means for processing is configured to:
    generate a sequence of bits occurring just before the desired future sequence state, using the one or more m-parameters; and
    employ the generated sequence of bits to initialize the shift register.

27. The apparatus of claim 26, further comprising a component to add results of the first output value to create a first random sequence and for adding results of the second output value to create a second random sequence.

28. A non-transitory computer-readable medium comprising instructions which, when executed by a computer, cause the computer to perform operations including:
  generating a first masking vector from a sequence generator polynomial and a first cyclic shift;
  generating a second masking vector from the sequence generator polynomial and a second cyclic shift;
  employing the first and second masking vector to mask output values from a shift register to obtain a first output value and a second output value;
  generating one or more m-parameters in accordance with the first and second masking vectors, wherein different mask values are applied to at least two sets of the one or more m-parameters; and
  generating a desired future sequence state based on the first and second output values, the first and second masking vectors and the generated one or more m-parameters, wherein generating a future sequence state comprises;

generating a sequence of bits occurring just before the desired future sequence state, using the one or more m-parameters, and employing the generated sequence of bits to initialize the shift register.

29. The computer-readable medium of claim 28, further comprising generating a Gold sequence from at least two m-sequences.

30. An apparatus operable in a wireless communication system, comprising:

a processor, configured for:

generating a first masking vector from a sequence generator polynomial and a first cyclic shift;

generating a second masking vector from the sequence generator polynomial and a second cyclic shift;

generating one or more m-parameters in accordance with the first and second masking vectors, wherein different mask values are applied to at least two sets of the one or more m-parameters;

employing the first and second masking vectors to mask output values from a shift register to obtain a first output value and a second output value; and generating a desired future sequence state from the generated one or more m-parameters, the first and second masking vectors and the shift register output values, wherein the processor is configured to generate the desired future sequence state by:

generating a sequence of bits occurring just before the desired future sequence state, using the one or more m-parameters, and employing the generated sequence of bits to initialize the shift register.

31. The apparatus of claim 30, further comprising generating at least one Gold sequence value.

32. A communications method, comprising:

employing a processor executing computer executable instructions stored on a computer readable storage medium to implement the following acts:

generating cyclic shifts for a sequence generator by masking output values from a shift register with one or more masking vectors;

generating one or more m-parameters in accordance with the one or more masking vectors, wherein different mask values are applied to at least two sets of the one or more m-parameters; and forwarding pseudorandom sequences within the sequence generator by setting a shift register state to a desired future state based on the output values, the generated one or more m-parameters and the one or more vectors, wherein setting the shift register to the desired future state comprises:

generating a sequence of bits occurring just before the desired future state, using the one or more m-parameters, and employing the generated sequence of bits to initialize the shift register.

33. The method of claim 32, the future state depends on a generating polynomial, a number of steps of forwarding required, or an initial state.

34. The method of claim 32, further comprising using the one or more m-parameters to generate a consecutive sequence of bits occurring before the desired future state, employing the bits to initialize the shift register state.

* * * * *